(12) United States Patent
Atkinson et al.

(10) Patent No.: US 8,509,098 B2
(45) Date of Patent: Aug. 13, 2013

(54) METHOD AND APPARATUS FOR IDENTIFYING NETWORK CONNECTIVITY CHANGES IN DYNAMIC NETWORKS

(75) Inventors: Gary W. Atkinson, Freehold, NJ (US); Xiang Liu, Marlboro, NJ (US); Ramesh Nagarajan, Princeton Junction, NJ (US); Shyam P. Parekh, Orinda, CA (US)

(73) Assignee: Alcatel Lucent, Paris (FR)

( * ) Notice: Subject to any disclaimer, the term of this patent is extended or adjusted under 35 U.S.C. 154(b) by 1318 days.

(21) Appl. No.: 11/414,126

(22) Filed: Apr. 28, 2006

(65) Prior Publication Data

US 2007/0253341 A1    Nov. 1, 2007

(51) Int. Cl.
*G01R 31/08* (2006.01)
*H04W 4/00* (2009.01)

(52) U.S. Cl.
USPC .......................................... 370/252; 370/341

(58) Field of Classification Search
USPC .................................................. 370/252, 341
See application file for complete search history.

(56) References Cited

U.S. PATENT DOCUMENTS

| | | | | |
|---|---|---|---|---|
| 5,404,451 | A * | 4/1995 | Nemirovsky et al. | 709/241 |
| 6,058,260 | A * | 5/2000 | Brockel et al. | 703/4 |
| 6,990,335 | B1 * | 1/2006 | Shamoon et al. | 455/419 |
| 7,313,095 | B1 * | 12/2007 | Nucci et al. | 370/238 |
| 7,403,988 | B1 * | 7/2008 | Blouin et al. | 709/223 |
| 8,018,860 | B1 * | 9/2011 | Cook | 370/244 |
| 2002/0119796 | A1 * | 8/2002 | Vanghi | 455/522 |
| 2003/0012216 | A1 * | 1/2003 | Novaes | 370/432 |
| 2005/0048976 | A1 * | 3/2005 | Kalhan et al. | 455/440 |
| 2006/0104219 | A1 * | 5/2006 | Kennedy | 370/254 |
| 2006/0268731 | A1 * | 11/2006 | Moore | 370/252 |
| 2007/0093257 | A1 * | 4/2007 | McDougall et al. | 455/456.1 |

OTHER PUBLICATIONS

G. Atkinson et al., "Dynamic Topology Control in Ad Hoc Networks with Directional Links," Proc. IEEE MILCOM 05, Oct. 17-20, 2005.

* cited by examiner

*Primary Examiner* — Mark Rinehart
*Assistant Examiner* — Angel Brockman
(74) *Attorney, Agent, or Firm* — Wall & Tong, LLP

(57) ABSTRACT

The invention comprises a method and apparatus for determining a network connectivity in a network having a plurality of nodes. In particular, one embodiment of the method includes generating a candidate link for each of a plurality of node pairs, predicting a performance of each candidate link by evaluating an expected impact of at least one condition on each candidate link, and determining the network topology using the predicted performances of the candidate links. The performance of each candidate link may be predicted by identifying at least one condition, determining the expected impact of the at least one condition on the candidate link, and predicting the performance of the candidate link by adjusting an expected performance of the candidate link using the expected impact of the at least one condition on the candidate link.

20 Claims, 8 Drawing Sheets

100

200

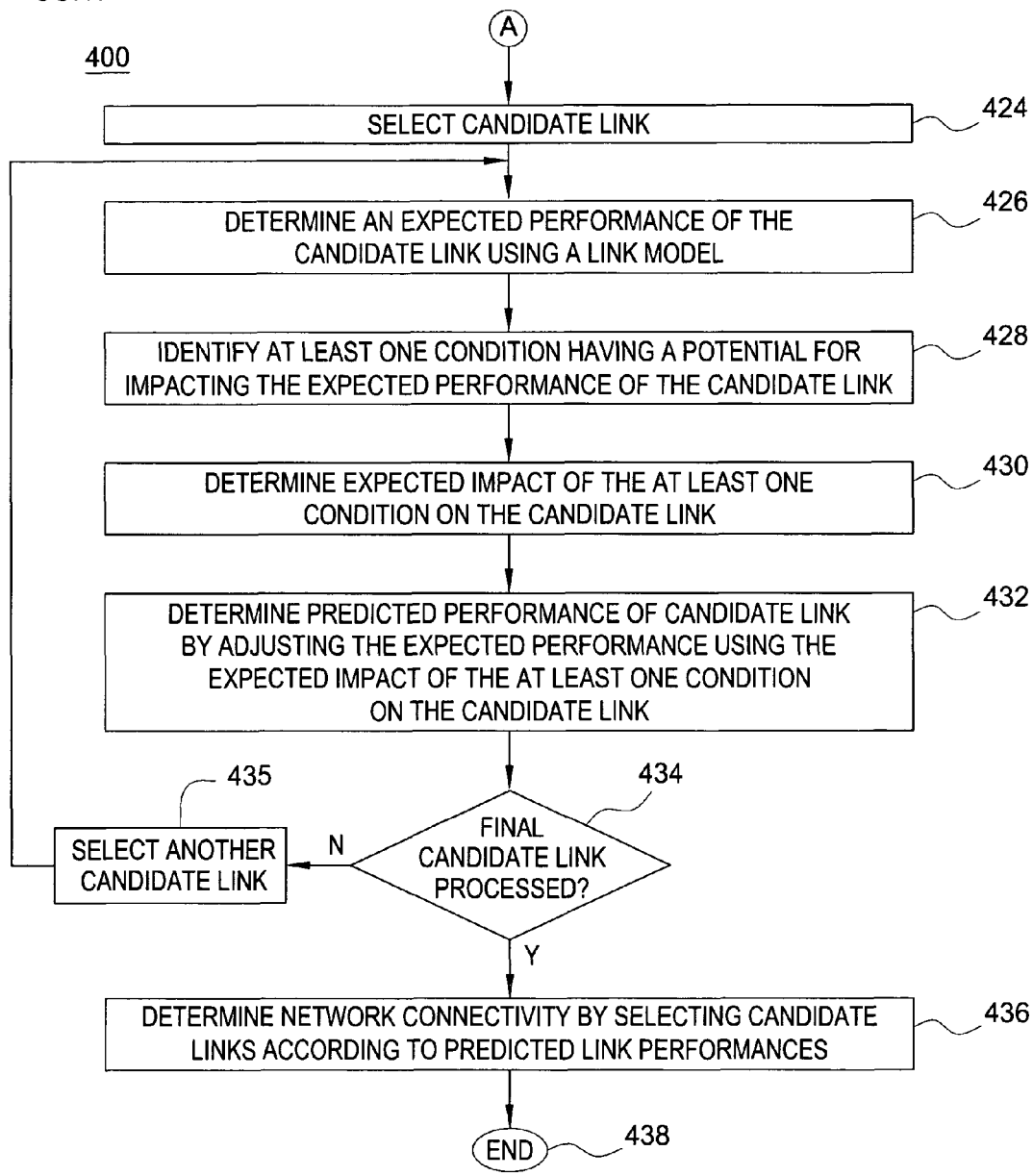

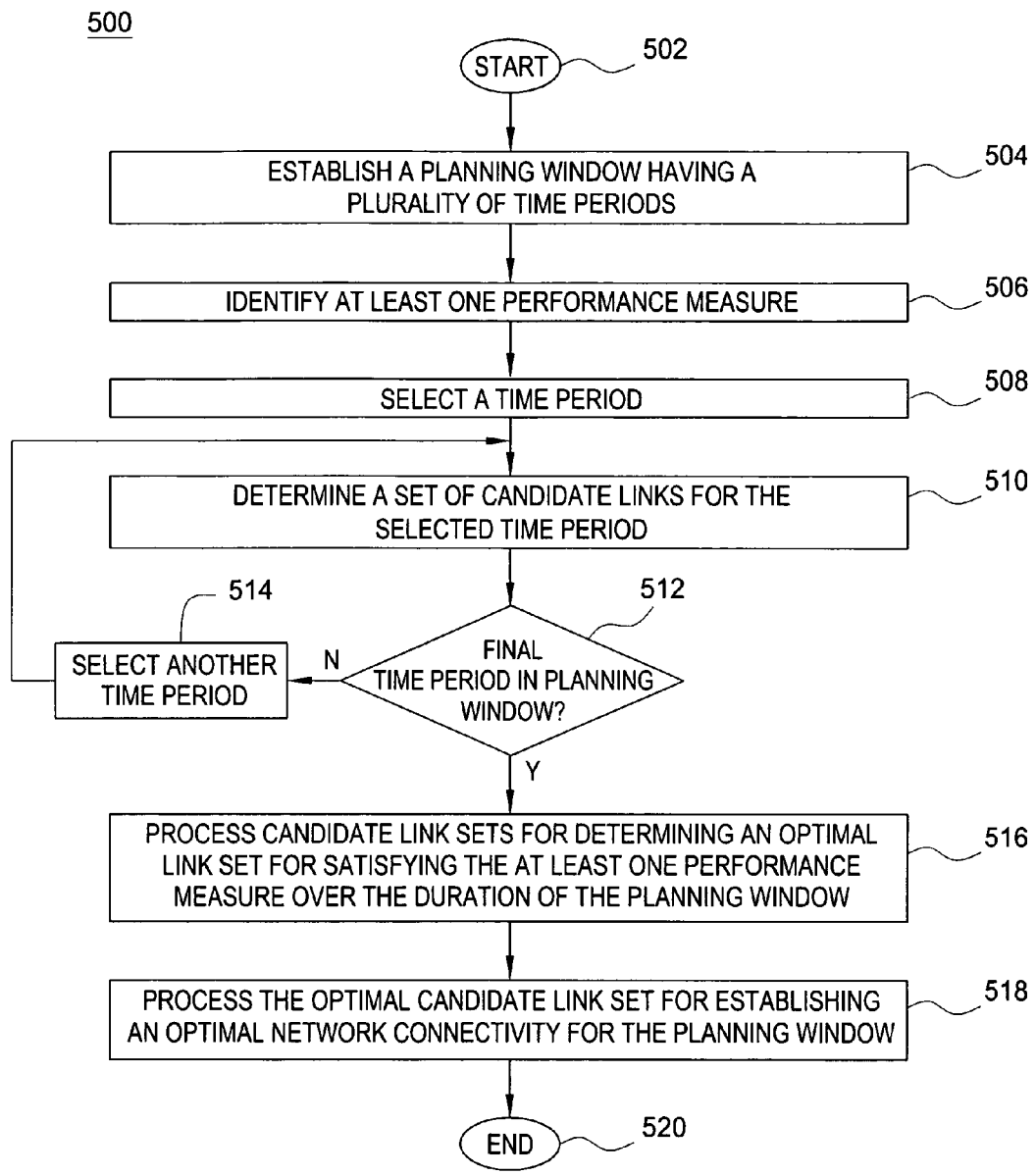

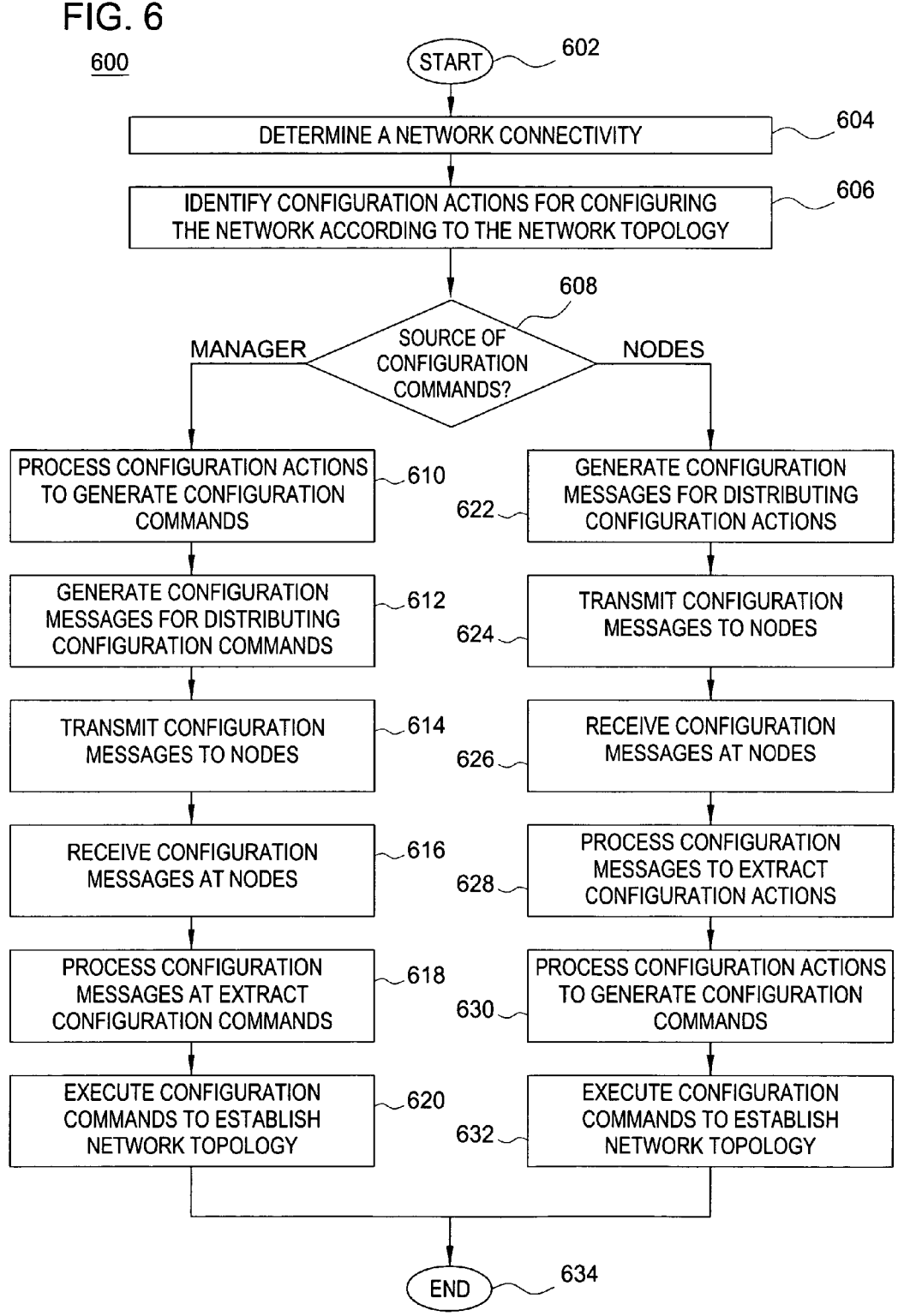

METHOD AND APPARATUS FOR IDENTIFYING NETWORK CONNECTIVITY CHANGES IN DYNAMIC NETWORKS

FIELD OF INVENTION

The invention relates to the field of communication networks, and, more specifically, network topologies of dynamic networks.

DESCRIPTION OF THE BACKGROUND ART

Heterogeneous ad hoc wireless networks often include stationary and mobile nodes, including nodes located in ground-based vehicles, ships, helicopters, airplanes, and satellites. The nodes typically communicate wirelessly with each other to provide end-to-end network connectivity. Due to the transient nature of such networks, the performance of an initially established network topology often declines as network conditions change. For example, performance of a communication link between a node located in a stationary ground-based vehicle and a node located in a moving airplane may be degraded by the relative motion between the nodes, atmospheric and weather conditions between the nodes, and the like. Thus, due to frequent changes in communication link quality in such a dynamic environment, there is a need to constantly manage the network topology in order to at least maintain end-to-end connectivity. Disadvantageously, however, in networks utilizing existing network topology management solutions, to the extent that they exist at all for such dynamic networks, topology changes often result in degraded network performance, even when they successfully maintain connectivity.

SUMMARY OF THE INVENTION

Various deficiencies associated with ad hoc network connectivity are addressed by determining network connectivity for a network, e.g., an ad hoc network, according to a predicted performance for each of a plurality of candidate links, where each candidate link is a logical representation of a potential communication link that may be physically established between a pair of nodes in the network. The candidate links are generated for a respective plurality of node pairs, and the performance of each candidate link is predicted by evaluating an expected impact of at least one condition on the candidate link. By predicting the performance of each of the respective candidate links, the present invention enables selection of candidate links, which, when physically established in the network, minimize the impact of various performance-impacting conditions on communication link quality, and, therefore, on end-to-end network connectivity.

In one embodiment, the candidate link is generated using a link model having at least one associated link parameter. In one embodiment, a candidate link includes the at least one link parameter associated with the link model, and node position information associated with each of the nodes in the node pair. The node position information may include geographical locations of the respective nodes, trajectories of the respective nodes, and like position information, as well as various combinations thereof. In one embodiment, the expected impact of the at least one condition on the candidate link is determined using node position information associated with the nodes in the node pair, and respective condition position information associated with each of the at least one condition.

In one embodiment, the performance of a candidate link may be predicted by identifying at least one condition, determining the expected impact of the at least one condition on the candidate link, and predicting the performance of the candidate link by adjusting an expected performance of the candidate link using the expected impact of the at least one condition on the candidate link. The conditions may include 1) network conditions, e.g., relative node motions and network congestion; (2) node resource conditions, e.g., capacity and processing constraints; (3) node mobility conditions, e.g., pointing and tracking constraints; (4) communication link conditions, e.g., capacity and performance constraints; (5) environmental conditions, e.g., terrain, atmospheric, and weather conditions; and (6) other performance impacting conditions, as well as various combinations thereof.

BRIEF DESCRIPTION OF THE DRAWINGS

FIG. 5 depicts a flow diagram of a method according to one embodiment of the invention;

FIG. 6 depicts a flow diagram of a method according to one embodiment of the invention.

To facilitate understanding, identical reference numerals have been used, where possible, to designate identical elements that are common to the figures.

DETAILED DESCRIPTION OF THE INVENTION

Figure 1:
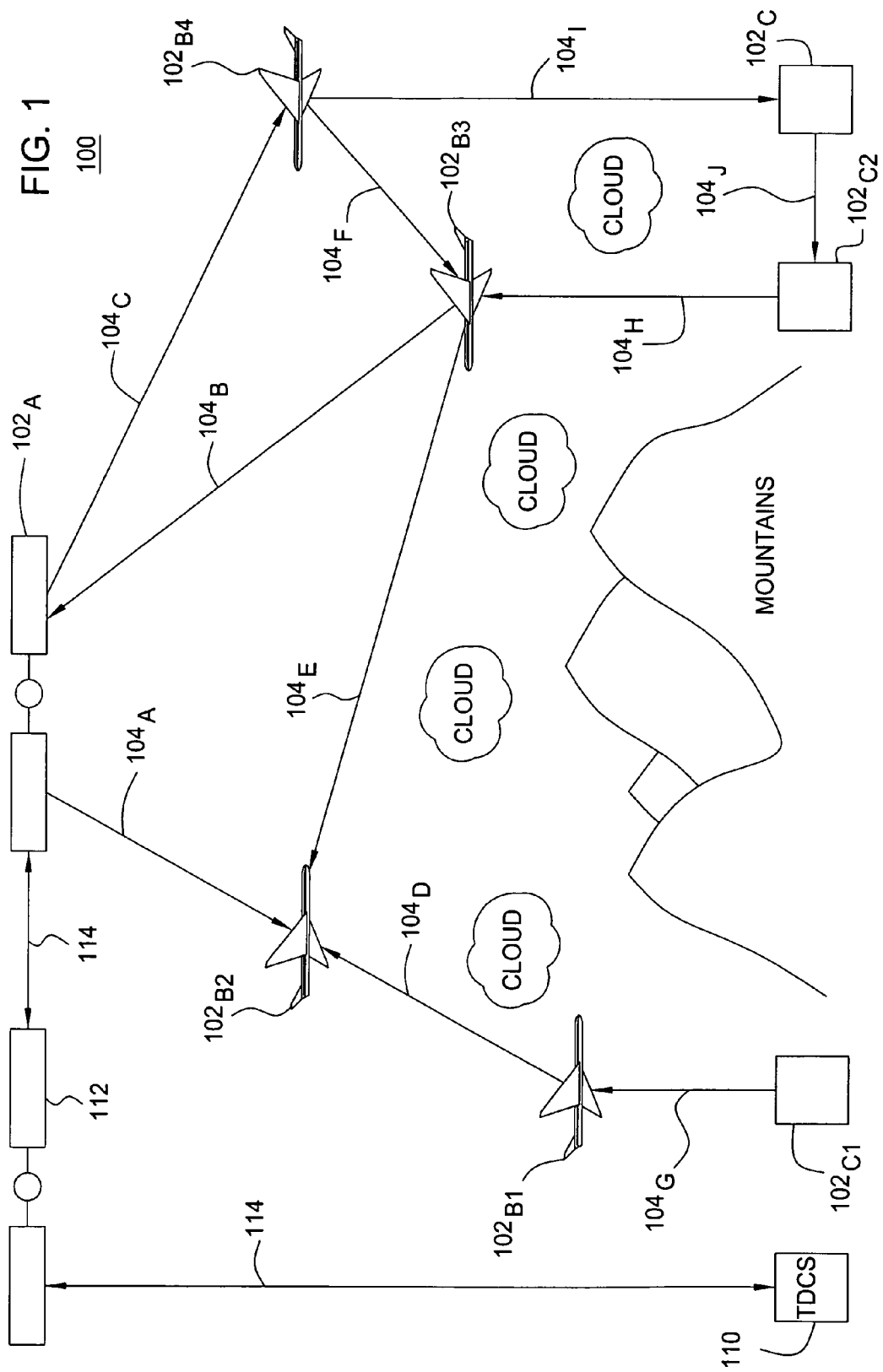
FIG. 1 depicts a high-level block diagram of a mobile communications network operating under particular environmental conditions.

In general, the present invention provides computational, model-based predictive methodologies for controlling a network topology in a heterogeneous mobile and fixed network environment having various dynamic timescales. A network topology generally refers to a combination of node position information and node connectivity information. The present invention performs parallel analysis across multiple network layers and technologies for optimizing one or more performance parameters of such heterogeneous mobile and fixed network environments. In order to optimize network resource utilization, the present invention determines a network topology, including node position and connectivity information, by analyzing numerous parameters (i.e., using contemporaneous consideration of numerous network connectivity considerations) such as prediction of node motion, prediction of link performance, node capabilities, node resources, connectivity requirements, traffic requirements, and the like, as well as various combinations thereof.

The present invention utilizes network topology analysis methodologies for determining, implementing, and managing the network topology for a network. In one embodiment, the present invention utilizes network topology analysis methodologies for determining, implementing, and managing the network topology for a network in order to optimize at least one performance criteria. In one embodiment, the performance criteria include at least one of link-layer performance criteria, network-layer performance criteria, transport-layer performance criteria (e.g., end-to-end network throughput requirements), and like performance criteria, as well as various combinations thereof. In one embodiment, the performance criteria include at least one of network requirements (e.g., throughput requirements, connectivity requirements, and the like), service requirements, and the like, as well as various combinations thereof.

The network topology is determined using network topology analysis. The network topology analysis may be performed using network topology analysis parameters and performance impacting conditions. The network topology analysis parameters include network characteristics, e.g., network type, network size, and the like, node characteristics, e.g., node type, node resources, node mobility, and the like, communication link characteristics, e.g., communication link type, communication link directionality, and the like, and like parameters, as well as various combinations thereof. The performance impacting conditions include network conditions, e.g., relative node motions, network congestion, and the like, node resource conditions, e.g., node capacity constraints, node processing constraints, and the like, node mobility conditions, e.g., pointing constraints, tracking constraints, and the like, communication link conditions, e.g., link capacity constraints, link performance constraints, and the like, environmental conditions, e.g., terrain conditions, atmospheric conditions, weather conditions, and the like, and like conditions, as well as various combinations thereof.

The present invention, using various network topology analysis parameters and performance impacting conditions, determines a network topology. In one embodiment, since node positions may change over time, the present invention may determine network connectivity. The network connectivity may be determined by generating a candidate link for each of a plurality of node pairs, predicting a performance of each candidate link by evaluating an expected impact of at least one condition on each candidate link, and determining the network connectivity using the predicted performances of the candidate links. A candidate link may be a logical representation of a potential communication link which may be physically established in the network. In one embodiment, the performance of each candidate link may be predicted by identifying at least one condition, determining the expected impact of the at least one condition on the candidate link, and predicting the performance of the candidate link by adjusting an expected performance of the candidate link using the expected impact of the at least one condition on the candidate link.

In one embodiment, the performance of each candidate link may be predicted using position information. In one such embodiment, node position information associated with each node in a node pair and condition position information associated with each of a plurality of conditions associated with the network may be used for predicting the performance of each candidate link. For example, for each node in a node pair, node position information may include geographical location and/or, acceleration information, trajectory information, and the like, as well as various combinations thereof. For example, depending upon the condition, condition position information may include latitude/longitude/altitude information, elevation information, and the like, as well as various combinations thereof. The position information may include planned values, predicted values, actual values, and the like, as well as various combinations thereof.

The present invention includes communication link performance prediction methodologies for performing the network topology (or network connectivity) optimization analysis. The communication link performance prediction methodologies utilize the network topology analysis parameters for predicting the performance of communication links under various performance impacting conditions. In one embodiment, candidate link performance is based on any measure of link quality. In one such embodiment, in which the network under consideration utilizes directional links, candidate link performance is based on any measure of directional link quality. The candidate link performances are used for determining the network connectivity for optimizing network performance. In one embodiment, network connectivity may be used in conjunction with node position information for further optimizing network performance.

In one embodiment, the network connectivity is represented using configuration actions. In one embodiment, configuration actions comprise link configuration actions. In one embodiment, link configuration actions identify new links that should be established in the network (i.e., established links), existing links in the network that should be maintained (i.e., maintained links), existing links in the network that should be reconfigured (i.e., reconfigured links), existing links in the network that should be replaced by removing the link between the nodes and replacing the removed link with a new link (i.e., replaced links), and existing links in the network that should be removed (i.e., removed links). In other words, configuration actions include link establishment, link maintenance, link reconfiguration, link replacement, link removal, and the like, as well as various combinations thereof. As such, the determined network connectivity is represented using configuration actions adapted for modifying an existing network topology to form the determined network topology.

In one embodiment, a management system processes the configuration actions to generate configuration commands operable for modifying the existing network connectivity (and, therefore, network topology) to produce the determined network connectivity (and, therefore, network topology). The configuration commands are distributed to the associated nodes by grouping the configuration commands into configuration messages. The configuration messages are transmitted to the nodes associated with the configuration actions. Upon receiving the configuration messages, the nodes process the configuration messages to extract the configuration commands required for modifying the network connectivity in accordance with the associated configuration actions. The extracted configuration commands are executed by the nodes to implement the configuration actions in the network, thereby adapting the network connectivity to form the determined network connectivity.

In one embodiment, a management system processes the configuration actions for grouping the configuration actions into configuration messages. The configuration messages are transmitted to the nodes associated with the configuration actions. Upon receiving the configuration messages, the nodes process the configuration messages to extract the configuration actions. The nodes process the configuration actions to generate associated configuration commands required for modifying the network connectivity in accordance with the associated configuration actions. The configuration commands are executed by the nodes to implement the configuration actions in the network, thereby adapting the network connectivity (and, therefore, network topology) to form the determined network connectivity (and, therefore, network topology).

In one embodiment, the present invention is implemented as a primarily centralized, i.e., more centralized than distributed, system. In this embodiment, a centralized network management system (illustratively, TDCS 110) performs a portion of the functions of the present invention, and each of the nodes (illustratively, nodes 102) performs a portion of the functions of the present invention. In one embodiment, global information may be advertised to the network periodically by the centralized network management system. In one embodiment, global information may be requested by the nodes. In one embodiment, local information may be advertised to the network, including the centralized network management system, periodically by the nodes. In one embodiment, local information may be requested by the centralized network management system.

In one embodiment, the centralized network management system performs centralized decision making using global network information gathered and/or received from various sources (e.g., other management systems, nodes, and the like), local information gathered and/or received from the nodes, and the like, as well as various combinations thereof. In one embodiment, each node performs at least a portion of the functions of the present invention, using various combinations of local information associated with the nodes, distributed information shared between nodes (e.g., network state information), global information provided by the centralized network management system, and the like, as well as various combinations thereof. In this embodiment, local network connectivity decisions must provide global end-to-end connectivity. As such, in one embodiment, a centralized network management system and associated nodes operate together as a distributed system for determining an optimal or near-optimal network connectivity (and, therefore, network topology) in a continuously changing network environment.

Although primarily described herein with respect to determining network connectivity at a particular point in time, in one embodiment, the present invention determines network connectivity over a network planning window having a plurality of time intervals. In one such embodiment, network connectivity and topology analysis is performed for each of the time periods in the network planning window. In one further embodiment, network connectivity and topology analysis is performed at each of a plurality of instants of time within each time period of the network planning window (i.e., the predicted performance of each candidate link is determined at each of a plurality of instants of time within each time period). In one such embodiment, the present invention performs multi-interval network connectivity and topology analysis for determining an optimum network connectivity and associated network topology for the network at each of a plurality of time intervals in a network planning window, thereby attaining optimal network performance over the entire planning window.

In one embodiment, the time intervals at which network connectivity and topology analysis is performed are determined according to changes in conditions impacting the network (i.e., on an as-needed basis over the network planning window). In one embodiment, the analysis times are predetermined times in the network planning window (e.g., periodically, at fixed non-periodic times, and the like). In one embodiment, network connectivity and topology determination methodologies are performed prior to the actual network planning window by simulating conditions during the network planning window (i.e., offline). In one embodiment, network connectivity and topology determination methodologies are performed during the actual network planning window (i.e., on-the-fly).

In one embodiment, the determined network connectivity is represented as a configuration schedule identifying configuration actions required at each of the analysis times in the network planning window. In one embodiment, generation of the associated configuration commands is performed according to the configuration schedule. In another embodiment, generation of the associated configuration commands is performed prior to the actual start of the network planning window. In this embodiment, the configuration commands required over the course of the network planning window may be determined and distributed to the nodes prior to the start of the network planning window. The configuration commands are then executed by the nodes at each of the respective analysis times in the network planning window.

FIG. 1 depicts a high-level block diagram of a communication network including a plurality of nodes communicating using a plurality of communication links. Specifically, communication network 100 comprises a satellite $102_A$, a plurality of mobile aerial vehicles $102_{B1}$-$102_{B4}$ (collectively, mobile aerial vehicles $102_B$), and a plurality of terrestrial vehicles $102_{C1}$-$102_{C3}$ (collectively, terrestrial vehicles $102_C$). In one embodiment, terrestrial vehicles $102_C$ may include fixed nodes. In one embodiment, fixed nodes may include immobile nodes. In one embodiment, terrestrial vehicles $102_C$ may include mobile nodes operable for moving. In one such embodiment, mobile nodes may be fixed and/or mobile during the time of communication (e.g., during the network planning window). As such, the present invention may be used for determining network connectivity between various combinations of fixed immobile nodes, fixed mobile nodes, mobile nodes, and the like. The satellite $102_A$, mobile aerial vehicles $102_B$, and terrestrial vehicles $102_C$ are collectively denoted as mobile nodes 102.

The satellite $102_A$ includes any type of satellite operable for communicating with fixed terrestrial nodes, mobile terrestrial nodes, mobile aerial nodes, satellites, and the like. The satellite $102_A$ includes an in-view satellite of a satellite constellation. For example, in one embodiment, satellite $102_A$ is a member of a low Earth orbit (LEO) satellite constellation. Although not depicted, multiple satellites of the constellation could be in view simultaneously. The mobile aerial vehicles $102_B$ include any type of mobile aerial vehicle operable for communicating with fixed terrestrial nodes, mobile terrestrial nodes, mobile aerial nodes, satellites, and the like. For example, in one embodiment, mobile aerial vehicles $102_B$ may include various combinations of unmanned aerial vehicles (UAVs), reconnaissance/surveillance aircraft, and the like. The terrestrial vehicles $102_C$ include any type of terrestrial vehicle operable for communicating with fixed terrestrial nodes, mobile terrestrial nodes, mobile aerial nodes, satellites, and the like. For example, in one embodiment, terrestrial vehicles $102_C$ may include various combinations of troop transport vehicles, armored vehicles, and the like.

Although not depicted in FIG. 1, at least a portion of the mobile nodes 102 includes at least one transponder for transmitting and receiving information over associated communication links. In general, a transponder converts between electronic and other signal types (optical, radio frequency, and the like) for sending and receiving information. For example, an optical transponder receives optical signals and converts the optical signals to electronic signals for transmission or receives an input electronic signal and converts the received electronic signal to an optical signal for transmission. In one embodiment, at least a portion of the transponders are operable for being steered. In one such embodiment, the transponders may be steered in different directions depending upon the relative positions of the mobile nodes between which the communication link is configured.

As depicted in FIG. 1, a plurality of communication links $104_A$-$104_J$ (collectively, communication links 104) is established between various combinations of the mobile nodes 102. In general, the communication links 104 comprise wireless communication links. More specifically, communication links 104 may be implemented using various link technologies. In one embodiment, in which at least a portion of the mobile nodes 102 utilize directed radio frequency (DRF) link technology, at least a portion of the communication links 104 comprise DRF links. In one embodiment, in which at least a portion of the mobile nodes 102 utilize FSO link technology, at least a portion of the communication links 104 are FSO links. As such, the communication links 104 comprise at least one of DRF links, FSO links, and the like, as well as various combinations thereof.

The satellite $102_A$ transmits to mobile aerial vehicle $102_{B2}$ using communication link $104_A$. The mobile aerial vehicle $102_{B3}$ transmits to satellite $102_A$ using communication link $104_B$. The satellite $102_A$ transmits to mobile aerial vehicle $102_{B4}$ using communication link $104_C$. The mobile aerial vehicle $102_{B1}$ transmits to mobile aerial vehicle $102_{B2}$ using communication link $104_D$. The mobile aerial vehicle $102_{B3}$ transmits to mobile aerial vehicle $102_{B2}$ using communication link $104_E$. The mobile aerial vehicle $102_{B4}$ transmits to mobile aerial vehicle $102_{B3}$ using communication link $104_F$. The terrestrial vehicle $102_{C1}$ transmits to mobile aerial vehicle $102_{B1}$ using communication link $104_G$. The terrestrial vehicle $102_{C2}$ transmits to mobile aerial vehicle $102_{B3}$ using communication link $104_H$. The mobile aerial vehicle $102_{B4}$ transmits to terrestrial vehicle $102_{C3}$ using communication link $104_I$. The terrestrial vehicle $102_{C3}$ transmits to terrestrial vehicle $102_{C2}$ using communication link $104_J$.

In general, the mobile nodes 102 depicted in FIG. 1 attempt to communicate in a manner for providing optimum network performance (e.g., high end-to-end network throughput over a time window) while subject to various performance-impacting conditions and constraints. In general, performance-impacting conditions include network conditions, node conditions, communication link conditions, environmental conditions, and like performance-impacting conditions, as well as various combinations thereof. For example, performance-impacting conditions depicted in FIG. 1 include terrain conditions (illustratively, mountains) and weather conditions (illustratively, clouds). Although primarily described herein with respect to environmental conditions, various combinations of performance-impacting conditions may be analyzed for determining optimum network connectivity (and, for known node position information, optimum network topology) using the methodologies of the present invention.

As depicted in FIG. 1, environmental conditions may prevent establishment of communication links between various combinations of mobile nodes 102. As described herein, environmental conditions that impact link performance and, therefore, network connectivity and topology, may comprise terrain conditions (e.g., mountains blocking line of sight), atmospheric conditions (e.g., clouds, fog, and the like), and like conditions, as well as various combinations thereof. For example, the mountains depicted in FIG. 1 may prevent a communication link from being established between terrestrial vehicle $102_{C1}$ and terrestrial vehicle $102_{C2}$. For example, the clouds depicted in FIG. 1 may prevent a communication link from being established between terrestrial vehicle $102_{C1}$ and mobile aerial vehicle $102_{B3}$.

Furthermore, since the environmental conditions may continuously change, and since the mobile nodes 102 move in relation to each other as well as the environmental conditions, environmental conditions may result in a variety of network connectivity and topology changes. In particular, environmental conditions may result in complete link failures such that the failed link cannot be replaced with a similar link (potentially requiring establishment of other communication links to support communications between the mobile nodes associated with the failed link), partial link failures such that the partially failed link can be replaced with a replacement link established between the mobile nodes associated with the partially failed link, link performance degradation such that the degraded link can be reconfigured, and like network connectivity changes, as well as various combinations thereof. The present invention determines a network connectivity adaptable in a manner for minimizing the impacts of such conditions on network performance. The modification of network connectivity in response to performance-impacting conditions is depicted and described herein with respect to FIG. 2.

Figure 2:
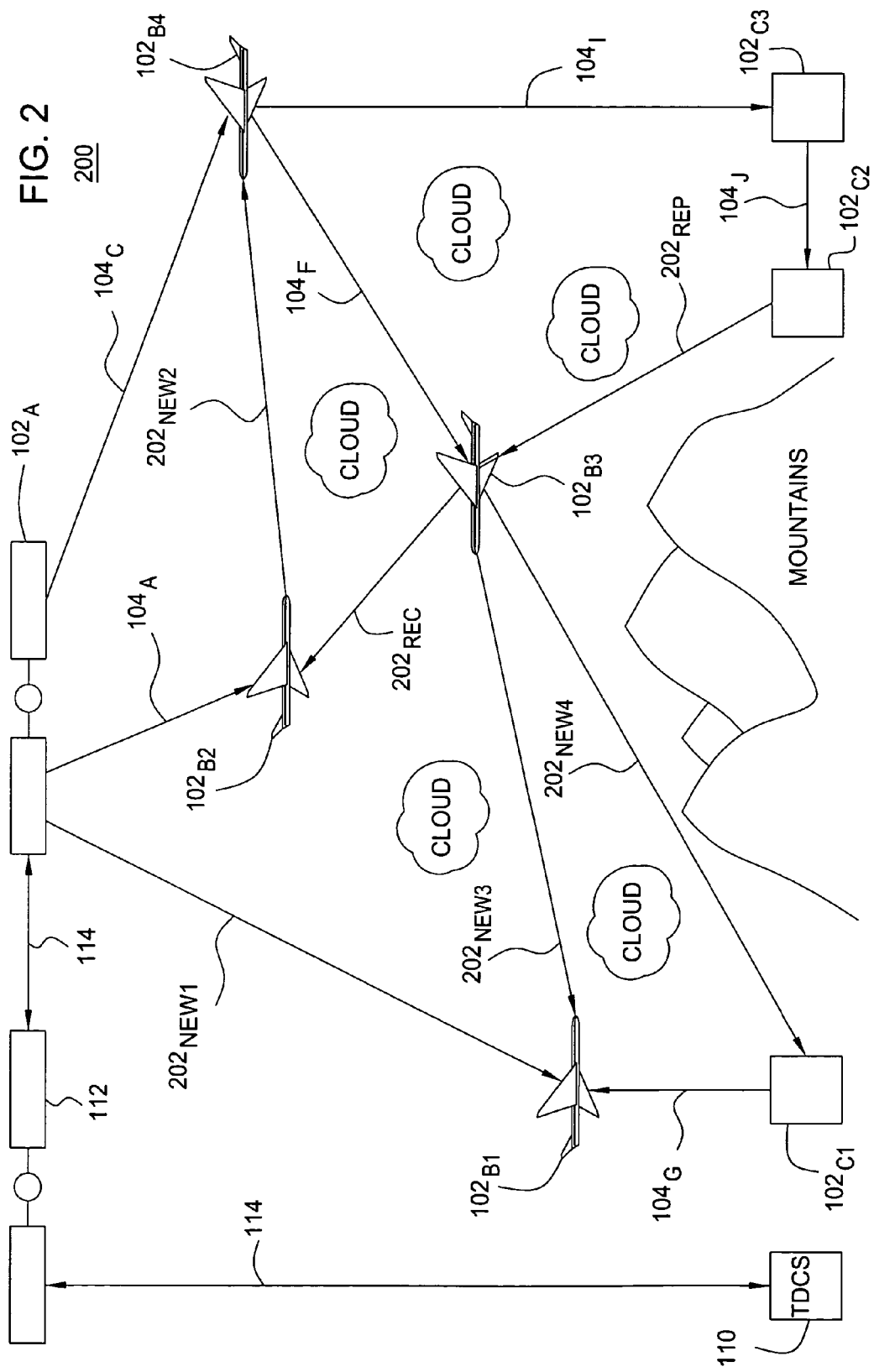
FIG. 2 depicts the mobile communications network of FIG. 1 in which the geographical locations of at least a portion of the mobile nodes have changed and the environmental conditions have changed.

FIG. 2 depicts the mobile communications network of FIG. 1 in which at least a portion of the mobile nodes have changed geographical locations and at least a portion of the environmental conditions have changed. As depicted in FIG. 2, the geographical location associated with each of the mobile nodes 102 has changed over time (i.e., between FIG. 1 and FIG. 2), with the exceptions of terrestrial vehicles $102_{C1}$ and $102_{C3}$ which, although capable of being mobile, remained fixed as the locations of other mobile nodes 102 changed. As such, since the geographical locations of a majority of the mobile nodes 102 have changed over time, the relative position of each of the mobile nodes 102 to a majority of each of the other mobile nodes 102 has changed. Similarly, as depicted in FIG. 2, the weather conditions (e.g., the locations of the clouds) in the region of the communication network 100 have changed over time (i.e., between FIG. 1 and FIG. 2). As such, since the weather conditions in the region of communication network 100 have changed over time, the relative position of at least a portion of the mobile nodes 102 to the weather conditions has changed, and the impact of the weather conditions on existing and potential communication links has changed.

In one embodiment, the present invention is operable for tracking node mobility changes and/or performance-impacting condition changes over time, as well as predicting future node mobility changes and performance-impacting condition changes for determining, implementing, and managing an optimum network topology of node movements and associated node connectivity. In one embodiment, an optimum network topology is a combination of communication links resulting in an optimized network performance measure. The network performance measure may include various link-layer performance measures, network-layer performance measures, transport-layer performance measures, and the like, as well as various combinations thereof. The optimum network topology is determined using node mobility information and performance-impacting condition information, as well as the interaction between node mobility information and performance-impacting condition information, and the impacts of such interactions on network connectivity.

In one embodiment, the present invention utilizes mobile node mobility information and predictions/extrapolations for determining the relative positions of each of the mobile nodes to each of the other mobile nodes. The mobile node mobility information includes current mobile node geographic locations, planned mobile node geographic locations, current mobile node trajectories, planned mobile node trajectories and the like, as well as various combinations thereof. In one embodiment, the present invention utilizes performance-impacting condition information for determining the relative positions of each of the mobile nodes to the performance-impacting conditions. The performance-impacting conditions include network conditions, node resource conditions, node mobility conditions, node connectivity conditions, communication link conditions, environmental conditions, and like performance-impacting conditions, as well as various combinations thereof.

In one embodiment, impacts of various combinations of performance-impacting conditions on candidate links between pairs of mobile nodes are determined using the relative positions of each of the mobile nodes to 1) each of the other mobile nodes and 2) each of the performance-impacting conditions. In one further embodiment, impacts of various combinations of performance-impacting conditions on candidate links between pairs of mobile nodes are determined by determining impacts of various combinations of performance-impacting conditions on node mobility associated with each of the mobile nodes. For example, mountains may impact line-of-sight between a pair of mobile nodes, thereby preventing establishment of a communication link between the mobile node pair. In continuation of this example, the mountains may impact the trajectory of a mobile node (e.g., the mobile node changes from a planned route over the mountains to an easier route that bypasses the mountains), thereby impacting the performance of predicted communication links between the mobile node and various other mobile nodes.

In one embodiment, the candidate communication links are associated with a respective plurality of node pairs from a set of node pairs, where the set of node pairs includes a combination of each node in the plurality of nodes to every other node in the plurality of nodes. In one embodiment, the candidate links are generated by identifying the candidate links according to the relative positions between the mobile nodes in each of the node pairs. In one further embodiment, the candidate links are generated by associating at least one link parameter with each of the candidate links. The link parameters include link technology (e.g., wireless links), link type (e.g., directed RF link, directed FSO link, and the link), link direction (e.g., the direction in which the link must be pointing in order to communicate with a remote node in the node pair), link capacity, link traffic characteristics, and like link parameters, as well as various combinations thereof.

In one embodiment, a predicted performance of each of the candidate links is determined according to an impact of at least one condition (i.e., performance impacting condition) on each of the candidate links, the impact of the at least one condition on each of the candidate links being determined using the relative positions of the mobile nodes in each of the plurality of node pairs. In one such embodiment, the network connectivity is determined according to the candidate link performances associated with each of the candidate links. In one embodiment, the network connectivity may be represented using a link schedule that delineates the link configuration actions required for modifying the network connectivity in response to the various conditions. As described herein, link configuration actions include link establishment, link maintenance, link reconfiguration, link replacement, and link removal. The link configuration actions performed in the transformation of communication network 100 from the network topology (including network connectivity) depicted in FIG. 1 to the network topology (including network connectivity) depicted in FIG. 2 are described herein with respect to FIG. 2.

As depicted in FIG. 2, the network connectivity of communication network 100 includes the communication links $104_A$, $104_C$, $104_F$, $104_G$, and $104_I$ present in the network connectivity of communication network 100 of FIG. 1. As such, the link configuration actions associated with communication links $104_A$, $104_C$, $104_F$, $104_G$, $104_I$, and $104_J$ comprise link maintenance actions (i.e., the communication links are maintained as the mobile nodes between which the links are established move relative to each other and various quality-impacting conditions). As depicted in FIG. 2, the network connectivity of communication network 100 does not include the communication links $104_B$, $104_D$, $104_E$, and $104_H$ present in the network connectivity of communication network 100 of FIG. 1. As such, the link configuration actions associated with communication links $104_B$, $104_D$, and $104_H$ include link removal actions (i.e., the communication links are removed as the mobile nodes between which the links are established move relative to each other and various quality-impacting conditions). Furthermore, in the network connectivity of communication network 100, communication link $102_E$ is reconfigured.

As depicted in FIG. 2, the network connectivity of communication network 100 includes new communication links $202_{NEW1}$, $202_{NEW2}$, $202_{NEW3}$, and $202_{NEW4}$, such that satellite $102_A$ transmits to mobile aerial vehicle $102_{B1}$ using new communication link $202_{NEW1}$, mobile aerial vehicle $102_{B2}$ transmits to mobile aerial vehicle $102_{B4}$ using new communication link $202_{NEW2}$, mobile aerial vehicle $102_{B1}$ transmits to mobile aerial vehicle $102_{B3}$ using new communication link $202_{NEW3}$, and mobile aerial vehicle $102_{B3}$ transmits to terrestrial vehicle $102_{C1}$ using new communication link $202_{NEW4}$. As depicted in FIG. 2, the network connectivity of communication network 100 includes reconfigured communication link $202_{REC}$ (a reconfiguration of communication link $104_E$) and replaced communication link $202_{REP}$ (a replacement of communication link $104_H$). The new communication links $202_{NEW1}$-$202_{NEW4}$, reconfigured communication link $202_{REC}$, and replacement communication link $202_{REP}$ are collectively referred to as communication links 202.

As depicted in FIG. 1 and FIG. 2, communication network 100 includes a topology decision control system (TDCS) 110. The TDCS 110 may be implemented as a fixed system or a mobile system. The TDCS 110 may be implemented as a terrestrial-based system, an aerial-based system, or a satellite-based system. Although depicted as a standalone system, in one embodiment, TDCS 110 may be implemented as a portion of at least one other system. For example, TDCS 110 may be implemented on a mobile terrestrial vehicle (illustratively, as a portion of one of the terrestrial vehicles $102_C$), on a mobile aerial vehicle (illustratively, as a portion of one of the mobile aerial vehicles $102_B$), and on a satellite (illustratively, as a portion of satellite $102_A$), as well as various combinations thereof.

As depicted in FIG. 1 and FIG. 2, TDCS 110 communicates with mobile nodes 102 using a satellite 112 and associated management communication links 114 between TDCS 110 and satellite 112 and between satellite 112 and satellite $102_A$. Although depicted as a communicating with the mobile nodes 102 using a single point of access, in one embodiment, TDCS 110 communicates, either directly or indirectly with a plurality of the mobile nodes 102. Although depicted as being implemented in an online system (illustratively, TDCS 110), in one embodiment, at least a portion of the methodologies of the present invention are implemented using one or more offline systems. The present invention is time scalable in accordance with varying time scales of the network.

The present invention enables determination of a network connectivity specifying which nodes in a network communicate with which other nodes (i.e., specifying the communication links by which the nodes communicate). In one embodiment, the determined network topology is an optimal network topology resulting in optimization of at least one performance criteria associated with the network. In one embodiment, the optimal network connectivity is determined over an associated network planning window such that the optimal network connectivity plan is determined as a function of time. In one embodiment, the optimal network connectivity plan is determined given various combinations of performance-impacting conditions. In one embodiment, since conditions under which the optimal network connectivity is determined change as a function of time, the optimal network connectivity changes as a function of time. In one embodiment, in which network connectivity information is supplemented with network node position information, the present invention may associate the network node connectivity and position information for determining an overall network topology.

For example, assuming a network planning window of one hour, since the network connectivity and topology analysis parameters and performance impacting conditions change over the course of the network planning window, continuous network connectivity changes may be required for maintaining an optimal network connectivity and, therefore, an optimal network topology. In one embodiment, network connectivity configurations are represented using various configuration actions. In one embodiment, configuration actions include link establishment, link maintenance, link reconfiguration, link replacement, link removal, and the like, as well as various combinations thereof. Since a network connectivity specifies communication link configurations, in one embodiment, network connectivity determination, implementation, and management in accordance with one embodiment of the present invention requires communication link management.

In one embodiment, communication link management is performed using a communication link schedule such that the communication link schedule is representative of the determined network connectivity. For example, if a determination is made, based on the current speed and trajectories of mobile aerial vehicles $102_{B1}$ and $102_{B2}$, as well as based on the atmospheric conditions and the projected changes in cloud cover conditions in the region in which mobile aerial vehicles $102_{B1}$ and $102_{B2}$ are operating, a determination may be made, at a particular time in the planning horizon, that communication link $104_D$ (as depicted in FIG. 2) should be removed. In continuation of this example, a determination may be made that, at a particular time in the planning horizon, new communication link $202_{NEW3}$ should be established between mobile aerial vehicles $102_{B1}$ and $102_{B3}$ existing communication link $104_E$ should be reconfigured to form communication link $202_{REC}$. In accordance with one embodiment of the present invention, methodologies for determining, implementing, and managing a network connectivity are depicted and described herein with respect to FIG. 3 and FIG. 4.

Figure 3:
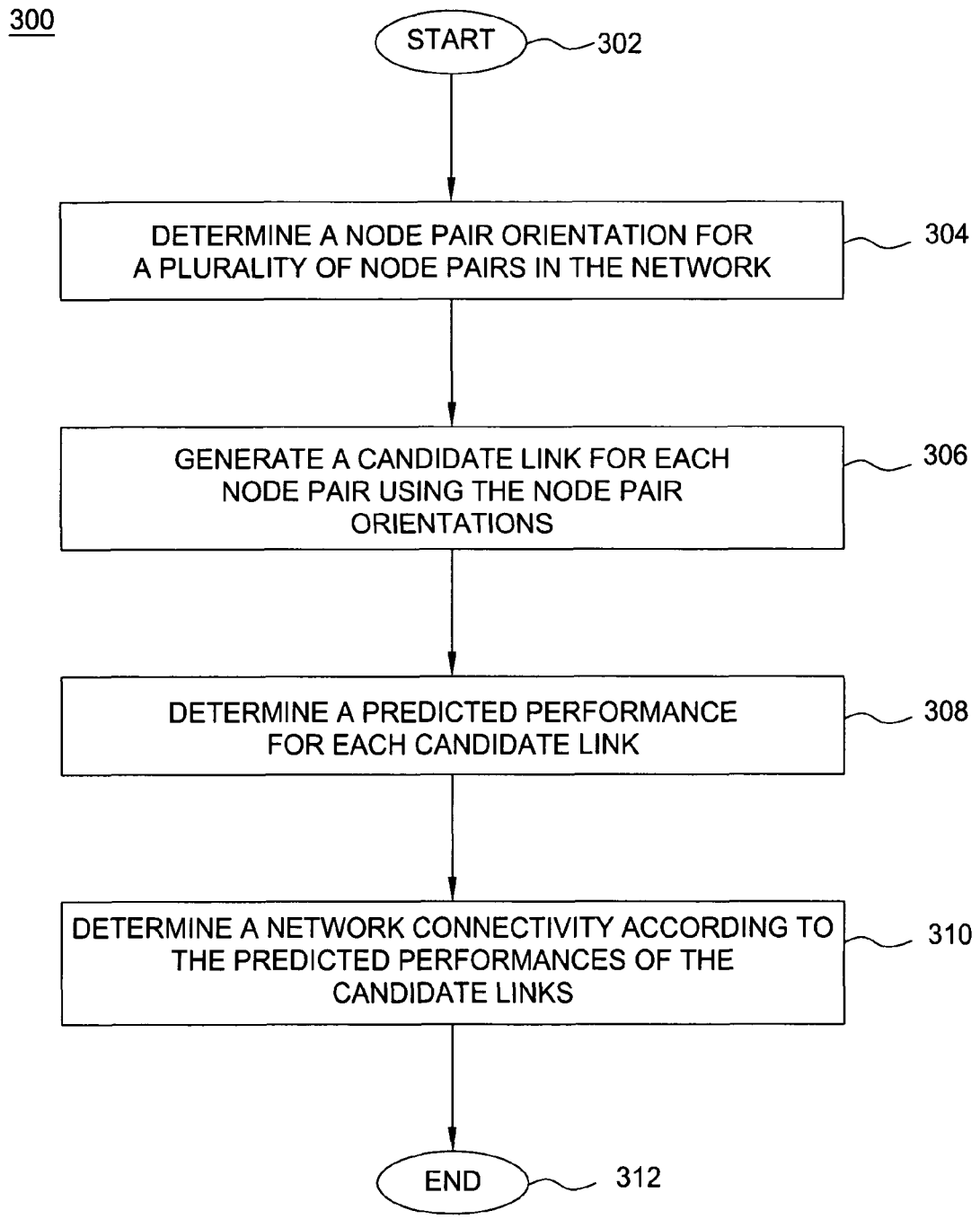
FIG. 3 depicts a flow diagram of a method according to one embodiment of the invention.

FIG. 3 depicts a flow diagram of a method according to one embodiment of the invention. Specifically, method 300 of FIG. 3 comprises a method for determining a network connectivity. Although a portion of the steps are depicted as being performed serially, those skilled in the art will appreciate that at least a portion of the steps of method 300 may be performed contemporaneously, as well as in a different order than presented in FIG. 3. Furthermore, although each step is depicted as being performed once, those skilled in the art will appreciate that at least a portion of the steps of method 300 may be performed multiple times. For example, in one embodiment, steps 304-308 may be performed multiple times, and the associated information may be provided to step 310 for comprehensive, contemporaneous analysis. The method 300 is entered at step 302 and proceeds to step 304.

At step 304, a node pair orientation is determined for each of a plurality of node pairs in a node pair set. In one embodiment, the node pair set includes an association from each node in the network to every other node in the network. In one embodiment, determining the node pair orientation for each node pair includes determining a first geographical location of a first node in the node pair, determining a second geographical location of a second node in the node pair, and determining the relative node position using the first and second geographical locations. In one embodiment, a node pair orientation is determined according to node mobility information associated with each node in the network. In one embodiment, node mobility information includes node geographical location, node trajectory, node speed, and like node mobility parameters, as well as various combinations thereof.

Although described herein with respect to the term node pair orientation, it should be noted that the term node pair orientation is understood to encompass position information associated with each of the nodes in the node pair, including, but not limited to, geographical positions of the respective nodes (e.g., instantaneous geographical positions, time-varying geographical positions, and the like, including longitude, latitude, and, optionally, altitude information, and the like, as well as various combinations thereof) individual movements of the respective nodes (e.g., starting position information, velocity information, acceleration information, trajectory information, intermediate position information, ending position information, and the like, as well as various combinations thereof), relative movements of the respective nodes, and the like, as well as various combinations thereof. In other words, the term node pair orientation is understood to include any position information, movement information, and like information, as well as various combinations thereof, useful for determining a network connectivity using the present invention.

At step 306, a candidate communication link is generated for each node pair in the set of node pairs. In one embodiment, generation of the candidate link includes generating a candidate link using a link model and associating at least one link parameter with the candidate link. In one such embodiment, the at least one link parameter associated with each candidate link includes at least one of network type, a node type, a node capacity, a first geographical location of a first node in the node pair, a second geographical location of a second node in the node pair, a link type, a link direction, a link range, a link capacity, and like parameters, as well as various combinations thereof.

At step 308, a predicted performance of each candidate link is determined. In one embodiment, determining the predicted performance of a candidate link includes determining an expected performance of the candidate link using a link model, identifying the at least one condition from a plurality of conditions associated with the network, the at least one condition identified using the node pair orientation of the candidate link, determining the expected impact of the at least one condition on the candidate link, and determining the predicted performance of the candidate link by adjusting the expected performance using the expected impact of the at least one condition on the candidate link.

At step 310, a network connectivity is determined according to the predicted performances of the candidate links. In one embodiment, the network connectivity is determined by selecting at least a portion of the candidate links according to the candidate link performances associated with the candidate links. In one embodiment, the candidate links are selected in a manner for optimizing at least one performance criteria. In one embodiment, performance criteria may include at least one of link-layer performance criteria, network-layer performance criteria, transport-layer performance criteria, e.g., end-to-end network throughput requirements, and like performance criteria, as well as various combinations thereof. In one embodiment, the performance criteria include at least one of network requirements, e.g., throughput requirements, connectivity requirements, and the like, service requirements, and the like, as well as various combinations thereof. The method 300 then proceeds to step 312, where the method 300 ends.

Figure 4:
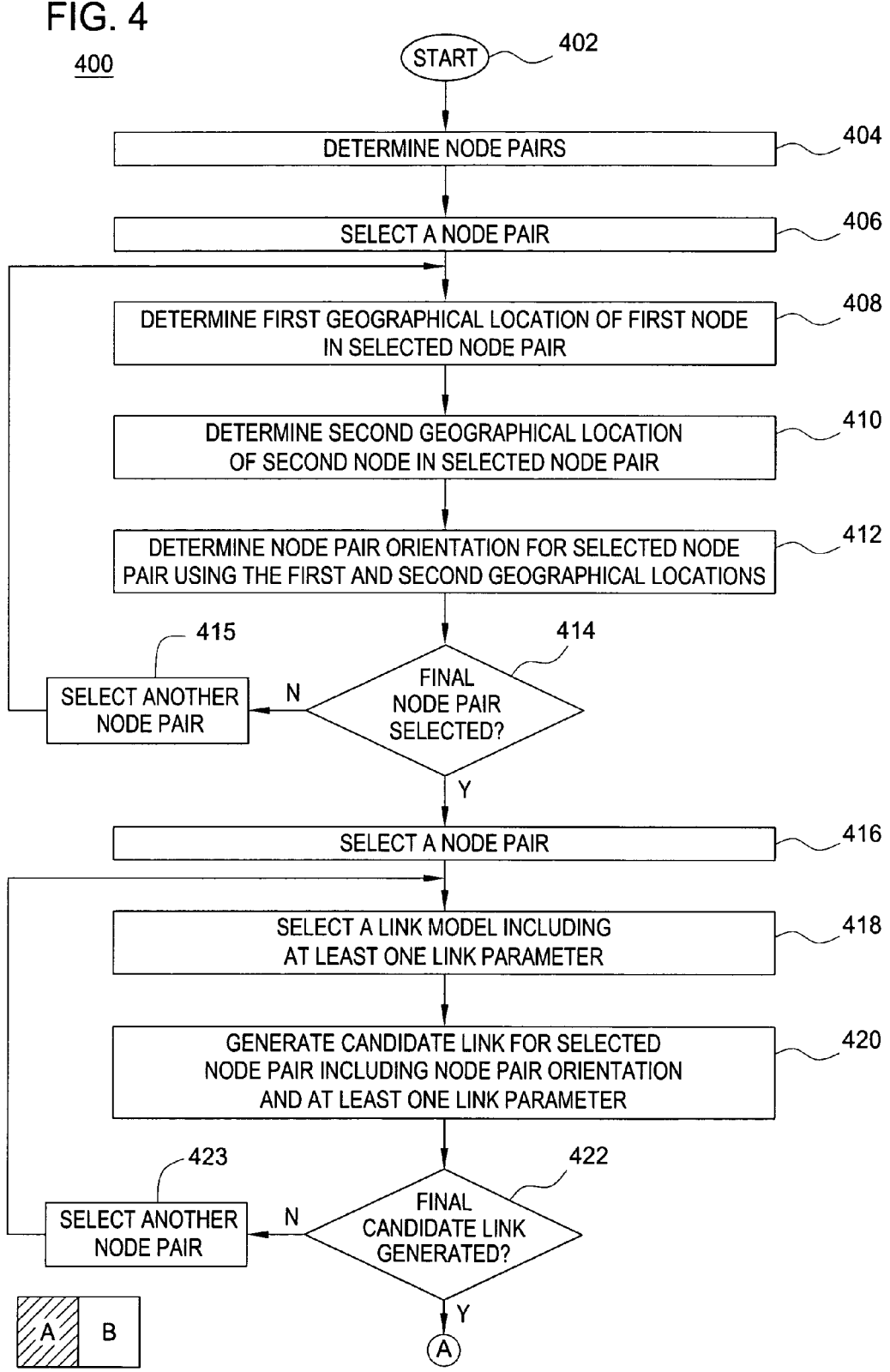
FIG. 4 depicts a flow diagram of a method according to one embodiment of the invention.

FIG. 4 depicts a flow diagram of a method according to one embodiment of the invention. In general, method 400 of FIG. 4 comprises a method for determining a network connectivity. Specifically, method 400 of FIG. 4 comprises a more detailed version of the method 300 depicted and described herein with respect to FIG. 3. Although a portion of the steps are depicted as being performed serially, those skilled in the art will appreciate that at least a portion of the steps of method 400 may be performed contemporaneously, as well as in a different order than presented in FIG. 4. The method 400 is entered at step 402 and proceeds to step 404.

At step 404, node pairs are determined (i.e., an association from each node in the network to every other node in the network is determined). The node pairs form a node pair set. At step 406, a node pair is selected from the node pair set. At step 408, a first geographical location of a first node in the node pair is determined. At step 410, a second geographical location of a second node in the node pair is determined. At step 412, a node pair orientation is determined for the selected node pair using the first geographical location and the second geographical location. At step 414, a determination is made as to whether the final node pair has been selected (i.e., whether a node pair orientation has been determined for each node pair in the set of node pairs). If the final node pair has not been selected, method 400 proceeds to step 415 where another node pair is selected. The method 400 then returns to step 408 for determining the node pair orientation of the selected node pair. If the final node pair has been selected, method 400 proceeds to step 416.

At step 416, a node pair is selected. At step 418, a link model is selected. In one embodiment, the link model includes at least one link parameter. In one embodiment, the at least one link parameter includes at least one of a link type, a link direction, a link range, a link capacity, and the like, as well as various combinations thereof. In one embodiment, the at least one link parameter may include at least one performance evaluation parameter adapted for determining the predicted performance of the candidate link, e.g., back-to-back performance of a transmitter-receiver pair, loss incurred during directed transmissions, and the like, as well as various combinations thereof.

At step 420, a candidate link is generated for the selected node pair. In one embodiment, the candidate link includes node pair orientation information and the at least one link parameter from the selected link model. In one embodiment, generation of the candidate link comprises modifying at least one of the at least one link parameter according to the associated node pair orientation. In one embodiment, the candidate link is a representation (i.e., a logical, software-based representation) of a physical link which could, potentially, be physically implemented in the network (e.g., the nodes are in range of each other), but which has not yet been physically implemented. In other words, a physical link is not generated; rather, a candidate link is generated for use in identifying a subset of generated candidate links, which, when physically realized as physical links in a network, comprise a desired network connectivity (e.g., the optimum set of candidate links which, when physically realized in a network, optimize at least one performance criteria of the network).

At step 422, a determination is made as to whether the final candidate link has been generated (i.e., whether a candidate link has been generated for each node pair). If the final candidate link has not been generated, method 400 proceeds to step 423 where another node pair is selected for generating an associated candidate link. The method 400 then returns to step 418 for generating a candidate link for the selected node pair. If the final candidate link has been generated, method 400 proceeds to step 424. Although not depicted, in one embodiment, determination of node pair orientations and associated generation of candidate links may be performed as an integrated process such that a candidate link is generated for each node pair contemporaneous with determination of the associated node pair orientation.

At step 424, a candidate link is selected. At step 426, an expected performance of the candidate link is determined using a link model. At step 428, at least one condition is identified. The at least one identified condition includes a condition having a potential for impacting the expected performance of the candidate link. At step 430, an expected impact of the at least one condition on the candidate link is determined. At step 432, the predicted performance of the candidate link is determined by adjusting the expected performance of the candidate link using the expected impact of the at least one condition on the candidate link. In one embodiment, that least one condition comprises at least one performance impacting condition (or at least a condition having a potential for impacting the expected performance of the candidate link).

At step 434, a determination is made as to whether the final candidate link has been processed (i.e., a determination is made as to whether predicted link performance has been determined for each of the candidate links generated for each of the respective node pair orientations). If the final candidate link has not been processed, method 400 proceeds to step 435 where another candidate link is selected. The method 400 then returns to step 426 for processing for determining the predicted performance of the selected candidate link. If the final candidate link has been processed, method 400 proceeds to step 436. At step 436, the network connectivity is determined by selecting candidate links according to the predicted performance of each of the candidate links. For example, in one embodiment, each candidate link having a performance throughput greater than a threshold throughput (and providing part of the end-to-end connectivity and for each demand) is selected for inclusion in the network connectivity. The method 400 then proceeds to step 438, where the method 400 ends.

FIG. 5 depicts a flow diagram of a method according to one embodiment of the invention. In general, method 500 of FIG. 5 comprises a method for determining a network connectivity. Specifically, method 500 of FIG. 5 comprises a method for determining a network connectivity over a planning window having a plurality of time periods. Since network connectivity and topology analysis parameters and performance impacting conditions change over time, determination of a network connectivity for optimizing at least one performance criteria requires network connectivity analysis at each of a plurality of time periods within the planning window over which network performance is optimized. Although a portion of the steps are depicted as being performed serially, those skilled in the art will appreciate that at least a portion of the steps of method 500 may be performed contemporaneously, as well as in a different order than presented in FIG. 5. The method 500 is entered at step 502 and proceeds to step 504.

At step 504, a planning window having a plurality of time periods is established. At step 506, at least one performance measure is identified. In one embodiment, the at least one performance measure includes at least one performance measure by which optimization of the network connectivity is determined. At step 508, a time period is selected. At step 510, a set of candidate links (i.e., network connectivity) is determined for the selected time period. In one embodiment, the set of candidate links is determined using at least a portion of the steps of method 300 depicted and described with respect to FIG. 3 or method 400 depicted and described with respect to FIG. 4. At step 512, a determination is made as to whether the final time period in the planning window has been processed. If the final time period in the planning window has not been processed, method 500 proceeds to step 514 where another time period is selected. The method 500 then returns to step 510, where a set of candidate links is determined for the selected time period. If the final time period in the planning window has been processed, method 500 proceeds to step 516.

At step 516, the candidate link sets are processed for determining an optimal or near-optimal candidate link set for satisfying the at least one performance condition over the duration of the planning window. In general, determination of the optimal link set includes: (1) capturing a look-ahead capability based on known information in order to avoid myopic decisions and (2) making connectivity control decisions accounting for multi-layer considerations (e.g., time-dependent link quality decisions in addition to connectivity decisions). The connectivity decision problems may be analyzed using one of a plurality of mixed-integer program formulations described herein. At step 518, the optimal candidate link set is processed for establishing the optimal network connectivity over the duration of the planning window. A method for establishing the optimal network connectivity over the duration of the planning window is depicted and described herein with respect to FIG. 6. The method 500 then proceeds to step 520 where the method 500 ends.

FIG. 6 depicts a flow diagram of a method according to one embodiment of the invention. In general, method 600 of FIG. 6 comprises a method for establishing a determined network connectivity in a network. Although primarily depicted and described herein with respect to establishing network connectivity between nodes, in one embodiment, in which node positions and associated movements may be controlled, network topology, including node position and connectivity, may be established in a network. Although a portion of the steps are depicted as being performed serially, those skilled in the art will appreciate that at least a portion of the steps of method 600 may be performed contemporaneously, as well as in a different order than presented in FIG. 6. The method 600 is entered at step 602 and proceeds to step 604.

At step 604, a network connectivity is determined. In one embodiment, the network connectivity is determined according to at least one of method 300 depicted and described with respect to FIG. 3, method 400 depicted and described with respect to FIG. 4, or method 500 depicted and described with respect to FIG. 5, or combinations thereof. At step 606, configuration actions are identified. In one embodiment, configuration actions for configuring the network according to the determined network connectivity are identified. In one embodiment, configuration actions are identified by comparing the selected candidate links (i.e., the set of selected candidate links which optimize at least one network performance criteria) to existing communication links in the network.

At step 608, a determination is made as to the source of the configuration commands. If a management system (e.g., a network management system) generates the configuration commands, method 600 proceeds to step 610. If a node (e.g., one of the network nodes) generates the configuration commands, method 600 proceeds to step 622. In one embodiment, an assumption may be made that the configuration commands are always generated by the management system. In this embodiment, method 600 proceeds from step 606 directly to step 610 (and steps 608 and steps 622 through 632 are not performed). In another embodiment, an assumption may be made that the configuration commands are always generated by the nodes. In this embodiment, method 600 proceeds from step 606 directly to step 622 (and steps 608 through 620 are not performed).

At step 610, the configuration actions are processed to generate configuration commands. In one embodiment, implementation of a configuration action in the network requires one configuration command. In one embodiment, implementation of a configuration action in the network requires a plurality of configuration commands. In one embodiment, implementation of a plurality of configuration actions in the network requires one configuration command. In one embodiment, implementation of a plurality of configuration actions in the network requires a plurality of configuration commands. As such, various combinations of configuration commands may be generated based on the combination of configuration actions required for implementing the determined network connectivity.

At step 612, configuration messages are generated for distributing the configuration commands to the associated nodes. In one embodiment, configuration commands are grouped to form configuration messages such that one configuration message is generated for each combination of a configuration action and an associated node. In one embodiment, configuration commands are grouped to form configuration messages such that one configuration message is generated for each node (i.e., all configuration commands associated with a node, irrespective of the configuration action with which the commands are associated, are grouped to form one configuration message for that node).

At step 614, the configuration messages are transmitted to the nodes. At step 616, the configuration messages are received at the nodes. At step 618, the configuration messages are processed to extract the configuration commands. At step 620, the configuration commands are executed to implement the network connectivity. In one embodiment, execution of a configuration command on a node may result in repositioning of the trajectory of a directional transponder in response to a change in the relative positions of the nodes between which the communication link is established, changing the gain of the transmission based on atmospheric conditions between the nodes, configuring node parameters, configuring communication link parameters, and the like, as well as various combinations thereof. The method 600 then proceeds to step 634 where method 600 ends.

At step 622 configuration messages are generated for distributing the configuration actions to the associated nodes. At step 624, the configuration messages are transmitted to the nodes. At step 626, the configuration messages are received at the nodes. At step 628, the configuration messages are processed to extract the configuration actions. At step 630, the configuration actions are processed to generate the configuration commands adapted for implementing the network connectivity. At step 632, the configuration commands are executed by each of the respective nodes on which the respective configuration commands are created to implement the network connectivity. The method 600 then proceeds to step 634, where method 600 ends.

For example, assume that, due to weather conditions, a communication link between a first node and a second node is replaced with a communication link between the first node and a third node. In this example, this configuration change may be represented using a "remove link" configuration action and an "establish link" configuration action. In this example, a configuration command may be generated for the "remove link" configuration action (i.e., for configuring the first node to tear down the link from the first node to the second node) and a pair of configuration commands may be generated for the "establish link" configuration action (i.e., for configuring the first node to transmit information to the third node and for configuring the third node to receive information from the first node). The generation of the configuration commands varies according to the source of the configuration commands.

In continuation of this example, in one embodiment, a configuration message including both configuration commands associated with the first node may be generated for delivering the configuration commands to the first node, and a configuration message including the configuration command associated with the third node may be generated for delivering the configuration command to the third node. In continuation of this example, upon receiving the configuration messages, the first node and the third node process the respective configuration messages to extract the configuration commands, and execute the configuration commands for implementing the "remove link" and "establish link" configuration actions.

In continuation of this example, in one embodiment, a configuration message including both configuration actions is generated for delivering the configuration actions to the first node. In continuation of this example, upon receiving the configuration messages, the first node and the third node process the configuration messages to extract the configuration actions. The first node and third node process the configuration actions for generating configuration commands. In continuation of this example, the first node generates configuration commands for the "remove link" and "establish link" configuration actions, respectively, and the third node generates a configuration command for the establish link" configuration action. The first node and third node execute the configuration commands for implementing the "remove link" and "establish link" configuration actions.

In one embodiment, a management system processes configuration actions for generating configuration commands, and the configuration commands are distributed from the management system to the nodes. In another embodiment, a management system distributes configuration actions to the nodes, and the nodes process the configuration actions for generating configuration commands. The nodes execute the configuration commands to implement the configuration actions in the network, thereby modifying the existing network connectivity to produce the determined network connectivity. The implementation of the configuration actions in the network using associated configuration commands results in a network connectivity satisfying the performance criteria upon which the network connectivity analysis was based. As such, the present invention enables the determination of an optimal or near-optimal network connectivity in a continuously changing network environment.

Although primarily described herein with respect to specific interaction between a centralized network management system and the nodes, in one embodiment, the centralized network management system performs centralized decision making using global network information gathered and/or received from various sources (e.g., other management systems, nodes, and the like), local information gathered and/or received from the nodes, and the like, as well as various combinations thereof. In one embodiment, each node performs at least a portion of the functions of the present invention, using various combinations of local information associated with the nodes, distributed information shared between nodes (e.g., network state information), global information provided by the centralized network management system, and the like, as well as various combinations thereof. In this embodiment, local network connectivity and connectivity decisions must provide global end-to-end connectivity. As such, in one embodiment, a centralized network management system and associated nodes operate together as a distributed system for determining a network connectivity for attempting to optimize one or more performance parameters.

As described herein, due to the dynamic variability of link quality resulting from relative node motion, atmospheric impairments, link geometry, obscurations, and like conditions, short-sighted network connectivity decisions may result in forced multiple re-connects in order to maintain sufficient link quality. Furthermore, given transmission breaks associated with reconnects, fewer reconnects employing lower quality links may provide better network performance than comparatively more reconnects using higher quality links. Thus, a major challenge of managing directional-link-based dynamically configurable networks is determining conditions under which communication links are established, maintained, reconfigured, and removed, and various combinations thereof.

As such, a primary motivation for connectivity control model development is creation of a framework for decision logic adapted for: (1) capturing a look-ahead capability based on known information in order to avoid myopic decisions and (2) making connectivity control decisions accounting for multi-layer considerations (e.g., time-dependent link quality decisions in addition to connectivity decisions). The connectivity control decision problems may be analyzed using one of a plurality of mixed-integer program formulations. For example, connectivity control decision problems may be analyzed using a mixed-integer program formulation in which a network connectivity update (i.e., network connectivity configuration action) may occur in each of a plurality of time periods of an evaluation time window.

In one embodiment, as described in this example, network connectivity update decision drivers are based on network connectivity, as well as physical link quality and potential reconnection penalties. In this example, assumptions associated with the mixed-integer program formulation include the following: (1) for the temporal planning horizon (i.e., evaluation time window), node motions, atmospheric conditions, and weather system motions are predictable; (2) a finite time is required for pointing, acquisition, and initial tracking (PAT) of free-space optical links for new link connections; (3) source-destination demand flows may be split; (4) the network nodes communicate with a network management system out-of-band radio frequency based signaling; and (5) the network nodes and associated network management system(s) support make-before-break (i.e., reconfiguration action) connections.

In one embodiment, as described in this example, the model formulation utilizes the following definitions:

Parameters/Inputs:
N=node set
T=(fixed) time intervals $\in \{0, 1, \ldots, |T|\}$
A=set of graph arcs ($a \in A \subset N \otimes N$, $(k,n) \in A$)
$\Delta t$=elapsed time per time interval
$\tau$=PAT time (may be node-dependent or arc-dependent)

D = index set of demands
$R^{dt}_{max}$ = max data rate for demand d during time interval t
$c^t_a$ = capacity of link a during time interval t
$I^t_a \in [0,1]$ = bandwidth Impairment for arc a during time t
K, $\epsilon$ = big constant, small constant
$\omega_d$ = weight or priority of demand d
$b^{in}_n$, $b^{out}_n$ = maximum (unidirectional) degree of node n
Decision Variables (Outputs):
$x^{dt}_a (\geq 0)$ = demand d flow over arc a during time interval t
$r^{dt}$ = data rate for demand d during time interval t.
$z^t_a = 1$ if arc a is connected at time t; otherwise 0
$u^t_a = 1$ if arc a is newly connected at time t; otherwise $\{0, -1\}$
$p^t_a (\geq 0)$ = data rate loss due to PAT along arc a at time t In accordance with the definitions, the model is formulated as specified in Eq. 1, subject to the conditions specified in C.1 through C.10:

$$\max \{\Delta t \Sigma_{t \in T} \Sigma_{d \in D} \omega_d r^{dt} - \tau \Sigma_{t \in T} \Sigma_{a \in A} p^t_a - \epsilon \Sigma_{t \in T} \Sigma_{a \in A} (z^t_a + \Delta t \Sigma_{d \in D} x^{dt}_a)\} \quad \text{(Eq. 1)}$$

C.1: Demand flow conservation at each node in each time interval:

$$\Sigma_{(n,j) \in A} x^{dt}_{nj} - \Sigma_{(i,n) \in A} x^{dt}_{in} = r^{dt}(\delta_{n,s_d} - \delta_{n,t_d}), \forall n \in N, d \in D, t \in T \quad \text{(C.1)}$$

C.2: Demand flow bounds on any arc in each time interval:

$$x^{dt}_a \leq r^{dt}, \forall a \in A, d \in D, t \in T \quad \text{(C.2)}$$

C.3: Demand source data rate bounds in each time interval:

$$r^{dt} \leq R^{dt}_{max}, \forall d \in D, t \in T \quad \text{(C.3)}$$

C.4: Flow indication for each arc in each time interval:

$$x^{dt}_a \leq K z^t_a, \forall a \in A, d \in D, t \in T \quad \text{(C.4)}$$

C.5: Performance-dependent arc capacity in each time interval:

$$\Sigma_{d \in D} x^{dt}_a \leq c^t_a (1 - I^t_a), \forall a \in A, t \in T \quad \text{(C.5)}$$

C.6: Performance-based arc availability in each time interval:

$$z^t_a \leq \lceil 1 - I^t_a \rceil, \forall a \in A, t \in T \quad \text{(C.6)}$$

C.7: Link connectivity change indication for each arc in each time interval:

$$z^{t+1}_a - z^t_a = u^{t+1}_a, \forall a \in A, t \in T \setminus \{|T|\} \quad \text{(C.7)}$$

C.8: Penalty determination for each arc in each time interval:

$$\Sigma_{d \in D} x^{dt}_a \leq p^t_a + K(1 - u^t_a), \forall a \in A, t \in T \quad \text{(C.8)}$$

C.9: Node in-degree constraints:

$$\Sigma_{(i,n) \in A} z^t_{in} \leq 2 b^{out}_n, \forall n \in N, t \in T \quad \text{(C.9)}$$

C.10: Node out-degree constraints:

$$\Sigma_{(n,j) \in A} z^t_{nj} \leq 2 b^{out}_n, \forall n \in N, t \in T \quad \text{(C.10)}$$

The formulation presented hereinabove quantifies a problem in which a set of mobile nodes N having potential interconnecting unidirectional arcs A wish to communicate via a set of demands D, possibly prioritized ($\omega_d$), over multiple time periods T, each of which has a duration of $\Delta t$. The mobile nodes N have a maximum in-degree ($b^{in}_n$) and a maximum out-degree ($b^{out}_n$) representing limitations of onboard transponders. The arcs A have a capacity ($c^t_a$) representing the maximum data rate between any two nodes in any time interval. For this particular formulation, the solution comprises the set of candidate links (and the associated configuration actions required for establishing, maintaining, reconfiguring (e.g., source-destination pair data rates are adjustable ($r^{dt}$) in any time interval up to a source access data rate limit ($R^{dt}_{max}$)), replacing, and/or removing the candidate links), as well as the times at which such configuration actions are performed ($z^t_a$), in order to optimize at least one performance quality measure (e.g., in order to maximize the total received data (bits) at destinations over the total time window).

The objective function specified in Eq. 1 receives contributions from three terms. The first term of Eq. 1 (i.e., $\Delta t \Sigma_{t \in T} \Sigma_{d \in D} \omega_d r^{dt}$) is total traffic received at each destination in each time interval, weighted by traffic priority. The second term of Eq. 1 (i.e., $\tau \Sigma_{t \in T} \Sigma_{a \in A} p^t_a$) is the topology change penalty computed as the product of the PAT time and $p^t_a$, the total bandwidth transmitted over the link during the time interval during which the connection is established. As constraint C.8 shows, $p^t_a$ is nonzero when arc a is newly established in interval t as indicated by $u^t_a$ from constraint C.7. The third term (i.e., $\epsilon \Sigma_{t \in T} \Sigma_{a \in A} (z^t_a + \Delta t \Sigma_{d \in D} x^{dt}_a)$) is present to squeeze out spurious non-zero elements in the solution. The constraints C.1, C.2, and C.3 form basic end-to-end network flow conditions where the demands at the sources and sinks are variable up to the limits of the source access data rates, as specified in condition C.4. The constraint C.5 sets the binary arc usage variables $\{z^t_a\}$ whenever flow is required over the associated arcs. The constraints C.9 and C.10 impose the transponder limits at each node.

The constraints C.6 and C.7 provide inputs from the previously-described link impairment model to determine which links are available during each time interval, as well as the associated link capacity. The constraints C.6 and C.7 rely on pre-calculated quantity $I^t_a$ (i.e., the bandwidth impairment for arc a during interval t), which depends on, among other things, desired performance parameters $BER_{th}$, $OP_{th}$, and the maximum range parameter for free-space optical links. In one embodiment, $I^t_a$ is computed using an offline tool which accepts known/predicted node locations and dynamics, atmospheric information, cloud formations and other obscurations, and a variety of transmitter and receiver characteristics as inputs.

For the temporal planning window, the pre-calculator evolves the network node motions according to their dynamics. At multiple instances during each topology update time interval (of length $\Delta t$), the outage probability (OP) of each link is calculated for the link geometry and propagation conditions at each instant and compared to the outage probability threshold, $OP_{th}$. As described herein, $I^t_a$ is the fraction of sampling instances during time interval t that arc a has a length greater than the maximum range allowed for the free-space optical link end points (or its performance is above threshold $OP_{th}$). As such, constraint C.7 enables arcs to be utilized during a time interval for which the impairment is not unity; however, due to constraint C.8, any impairment degrades the maximum capacity that a link can support during an interval. It should be noted that the above formulation comprises one of a plurality of potential formulations in accordance with various embodiments of the present invention. For example, other objective functions may be utilized, including formulations emphasizing delay, availability, and the like, as well as various combinations thereof.

In general, the present invention uses network connectivity and topology analysis methodologies for determining, implementing, and managing a network connectivity, and optionally, a network topology, for a network in order to optimize at least one performance criteria. In accordance with various embodiments of the present invention, various different mobile networks may be analyzed for determining, implementing, and managing network connectivity. As such, different links may be established, maintained, reconfigured, replaced, and removed for adapting network connectivity and, optionally, network topology for embodiments in which at least a portion of the node movements are controllable, to network changes (e.g., node location changes, network condition changes, and the like). In one embodiment, various link models and link modeling techniques may be used for generating candidate links and determining candidate link performances associated with the candidate links.

In one embodiment, a link model may accurately and comprehensively assess the performance of a communication link. In one such embodiment, a link model for a candidate link is established according to the node pair orientation of the node pair for which the candidate link is established. In general, performance of different links may vary significantly depending on a number of factors, so accurate assessment of link performance is important for determining the potential impact of the performance of a link on overall network performance. As such, in one embodiment, link modeling varies depending on link type (i.e., link models may vary for free-space optical links, radio frequency links, and the like). For example, in one embodiment, a free-space optical link model may be used for generating candidate free-space optical links and determining candidate link performances associated with the candidate free-space optical links.

As described herein with respect to links generally, the performance of a free-space optical link may vary depending on a number of factors, and assessment of the predicted performance of free-space optical links is important for determining the potential impact of the performance of the free-space link on overall network performance. In one embodiment, a free-space optical link model accounts for physical link performance and end-to-end connectivity for optimizing at least one performance parameter (e.g., throughput, availability, latency, and like quality measures). In one embodiment of a free-space optical link model, performance of the free-space optical link is determined according to a plurality of performance assessment factors. In one embodiment, performance assessment factors include the back-to-back performance of the transmitter-receiver pair, optical loss incurred during free-space optical transmissions, and scintillation effects.

As described herein, one performance assessment factor used in free-space optical link modeling is back-to-back performance of the transmitter-receiver pair. In one embodiment, back-to-back performance of the transmitter-receiver pair is assessed using back-to-back power margin. In one embodiment, back-to-back power margin is assessed as $P_{b\text{-}to\text{-}b}(dB) = P_{TX}(dBm) - P_{RX}(dBm)$, where $P_{TX}$ is the output power at the transmitter, and $P_{RX}$ is the receiver sensitivity. In general, $P_{TX}$ is normally limited by the saturation power of the optical amplifier used in the transmitter. For example, $P_{TX}$ may typically reach 40 dBm. In general, $P_{RX}$ is determined by the signal data rate and receiver design. For example, $P_{RX}$ may be about −36 dBm for receiving a 2.5-Gb/s on-off-keying (OOK) signal with an avalanche photodiode (APD). In one embodiment, using an erbium-doped fiber amplifier (EDFA) as an optical pre-amplifier, $P_{RX}$ can be lowered to about −44 dBm. In one embodiment, forward-error correction (FEC) may be used to further improve $P_{RX}$ by about 5 dB. Based on the above, the back-to-back power margin can be up to 89 dB.

As described herein, one performance assessment factor used in free-space optical link modeling is optical loss incurred during free-space optical transmissions. In one embodiment, optical loss incurred during free-space optical transmissions is expressed as $L_{FSO}(dB) = L_{air}(dB) + L_{space}(dB) + L_{TX\text{-}RX}(dB)$, where $L_{air}$ is atmospheric loss, $L_{space}$ is loss associated with the beam divergence and finite receiver aperture, and $L_{TX\text{-}RX}$ includes coupling loss and pointing/tracking loss at the transmitter and the receiver. For example, for a 36,000 kilometer free-space optical link between a geosynchronous equatorial orbiter (GEO) and a ground station, total loss may be approximately 86 dB, assuming a beam divergence of 0.2 m-rad and a receiver aperture diameter of 40 centimeters. In one embodiment, for a 2.5 Gb/s, 36,000 kilometer free-space optical link, a power margin of about 3 dB may be achieved.

As described herein, one performance degradation factor used in free-space optical link modeling is the scintillation effect, which causes irradiance fluctuations through air-turbulence induced small-scale thermal atmospheric variations. In one embodiment, scintillation effects produce refractive index inhomogeneities that produce scattering, thereby causing fluctuations in the instantaneous received optical power at the receiver. As such, in this embodiment, irradiance I at any instant is a random variable having a probability density function, denoted as pdf(I), which depends upon two parameters characterizing atmospheric behavior: altitude-dependent refractive-index structure parameter $C_n^2$ and turbulence inner scale. For certain link geometries and associated systems, dependence on turbulence inner scale is weak and may be suppressed. In this embodiment, probability density function pdf(I) follows a gamma-gamma distribution, as shown in Eq. 2:

$$pdf(I) = \frac{2(\alpha\beta)^{(\alpha+\beta)/2}}{\Gamma(\alpha)\Gamma(\beta)} I^{(\alpha+\beta)/2-1} K_{\alpha-\beta}(2\sqrt{\alpha\beta I}) \qquad \text{Eq. 2}$$

In the probability density function pdf(I), I is the normalized received power, $K_v(z)$ is a modified Bessel function of the second kind, and parameters $\alpha$ and $\beta$ are the effective number of large-scale and small-scale cells, respectively. In one embodiment, parameters $\alpha$ and $\beta$ may be obtained from the scintillation index, which is related to the $C_n^2$ distribution along the optical path of a free-space optical link. In one embodiment, the altitude-dependence of $C_n^2$ varies according to surface turbulence conditions. In one embodiment, an aperture-averaging effect reduces the scintillation index (or variance of the scintillation-induced power fluctuation). For example, aperture-averaging effect increases as the receiving aperture increases. Furthermore, the aperture-averaging effect is dependent upon the distribution of $C_n^2$ along the free-space optical link, and, as such, depends on transmission direction.

In one embodiment, performance of a free-space optical link may be assessed according to an instantaneous bit-error-rate (BER) of the free-space optical link. In embodiment, for example, in which an on-off keying scheme is used for transmissions over the free-space optical link, the instantaneous BER is related to the instantaneous received power as shown in Eq. 3:

$$BER(t) = \frac{1}{2}\text{erfc}\left(\frac{<SNR>}{\sqrt{2}} \cdot \frac{I(t)}{<I>}\right) \qquad \text{Eq. 3}$$

In this embodiment, in which the instantaneous BER is related to the instantaneous received power as shown in Eq. 2, <SNR> is the mean signal-to-noise-ratio (SNR) for a mean received power of <I>, and I(t) is the instantaneous receiver power irradiance at time t. It should be noted that, in this example, a linear relationship between <SNR> and the reference mean received power used for normalization is assumed. As such, BER(t) at any instant in time is a random variable. For example, in a comparison of mean BER at different surface $C_n^2$ values for the up-link and down-link portions of a sample free-space optical link, owing to a large aperture-averaging effect, the down-link BER performance is only slightly degraded by scintillation, in contrast to the severe degradation of the up-link BER performance.

In one embodiment, a threshold bit error rate, $BER_{th}$, is defined. In one such embodiment, the free-space link being analyzed is considered unusable when the instantaneous BER is greater than $BER_{th}$. In one such embodiment, a mean bit error rate $BER_{mean}$ may be computed for a given link geometry. In this embodiment, $BER_{mean}$ may be compared with $BER_{th}$ for assessing system performance, i.e., whether the quality of the free-space optical link is acceptable. In one embodiment, since BER(t) may vary significantly around the mean due to scintillation, the actual link quality of the free-space optical link may be poor in many instances in which $BER_{mean} \leq BER_{th}$. As such, in one embodiment, link performance may be quantified using the outage probability (denoted as OP) of the link as shown in Eq. 4:

$$OP = \int_0^{I_{th}} dI\, pdf(I) \qquad \text{Eq. 4}$$

In one such embodiment, for a specified $BER_{th}$, the instantaneous received power may be used for determining a power irradiance threshold $I_{th}$ at which the instantaneous BER equals $BER_{th}$. In this embodiment, outage probability OP, as denoted in Eq 3, provides the probability that $BER(t) \geq BER_{th}$. In one such embodiment, the performance of a free-space optical link is considered unacceptable when the OP of the free-space optical link is greater than a threshold $OP_{th}$ (e.g., when OP exceeds an acceptable-worst-case level). For example, in one embodiment in which 99.9% availability is required for a free-space optical link, the associated outage probability must be limited such that $OP \leq 10^{-3}$.

It should be noted that there is a distinct difference in system performance impact between noise (e.g., optical noise, thermal noise, and the like), and scintillation-induced power fluctuation. In generally, noise causes random errors on a bit-by-bit basis such that the errors can be effectively corrected using FEC techniques. By contrast, scintillation is a slow-varying effect, and may cause burst errors that can corrupt an entire FEC frame, possibly resulting in the loss of consecutive packets. As such, in one embodiment, outages caused by scintillation in free-space optical communications should be limited. In one embodiment, scintillation-induced outages may be limited by allocating additional power margin. For example, for a down-link, 1 dB additional margin is sufficient for a wide range of surface $C_n^2$ values while, for an up-link, more than 3 dB additional margin is required when surface $C_n^2$ exceeds $3 \cdot 10^{-14}$. In one embodiment, performance penalties dues to scintillation may be further reduced by lowering the signal data-rate, employing scintillation mitigation techniques, such as adaptive optical compensation, and the like. As described herein, free-space optical link quality models may be used for performing connectivity and topology control decision optimization for a dynamic network of mobile nodes.

In one embodiment, the present invention is extended to assess the performance of the network topology, including the established network connectivity, at the network layer (i.e., at the network routing layer). In general, the network routing layer determines the routing of individual packets over the communication network. In one embodiment, the present invention is extended to assess the performance of the network topology at the transport layer. In general, the transport layer controls the end-to-end performance using control measures such as congestion avoidance, congestion control, and like measures, as well as various combinations thereof.

In one embodiment, since the impact of end-to-end controls implemented at the transport layer is generally difficult to assess in the absence of an assessment of the performance of the network layer, the present invention is extended to assess the performance of the network topology at the network routing layer, and further extended to assess the performance of the network topology, including the established network connectivity, at the transport layer using the performance of the network connectivity at the network layer. In another embodiment, in the absence of an assessment (at the network layer) of the performance of the network connectivity, at least one network layer analysis model may be used for assessing the performance of the network connectivity at the transport layer. For example, a network layer analysis model may include a model of a thoroughly-studied congestion control mechanism. In one further embodiment, data associated with previous analyses of network layer routing protocols, transport layer congestion avoidance and control protocols, and like protocols may be utilized in assessing the performance of the network connectivity at the network layer, transport layer, and the like, as well as various combinations thereof.

For example, network connectivity and topology changes may trigger network layer routing protocol computations for discovering new routes through the network. In general, such processing for discovering new routes through a network topology results in associated processing delay times that may vary according to network type, network size, and like parameters. For FSO links, the route changes also require certain delay times for realigning new transmitter-receiver pairs. As such, in one embodiment, processing delay times are modeled as penalties associated with modifications to the network connectivity. For example, at least a portion of the communication links 104 may be established in a manner such that, during a reconnection between mobile nodes, the reconnecting communication link is subject to a Pointing-Acquisition-Tracking (PAT) penalty.

As such, the present invention performs network connectivity optimization analysis using model-based predictive methodologies, including communication link performance prediction methodologies, for determining optimal network connectivity for various combinations of network connectivity analysis parameters. The present invention may be used to perform the network connectivity optimization analysis under various conditions, and optimally configure links according to the determined network connectivity (which may change over time with associated node mobility changes, environmental condition changes, and the like) such that substantial improvements in network throughput are realized. Furthermore, the algorithms/methods of the present invention run reasonably fast such that network connectivity plans for networks with ten to twenty nodes may be computed in a matter of minutes. Thus, the present invention enables deployment of the network connectivity and topology to provide predictive semi-real-time controls for various networks.

In one embodiment, utilization of communication link analysis models for accurately and efficiently computing candidate link performances mitigates scalability problems given the numerous associated complication factors such as network type, network size, node mobility (e.g., some nodes, such as mobile aerial vehicles, move rapidly; some nodes, such as mobile terrestrial nodes, do not follow set routes and are more likely to face real-time conditions that result in immediate, unexpected reactions; and the like). Similarly, in one embodiment, utilization of communication link analysis models for accurately and efficiently computing candidate link performances in accordance with various embodiments of the present invention mitigate scalability problems associated with repeated execution of the methodologies of the present invention to include each possible communication link (N-factorial communication links in a network of N nodes), for a large number of time intervals in a network planning window.

Figure 7:
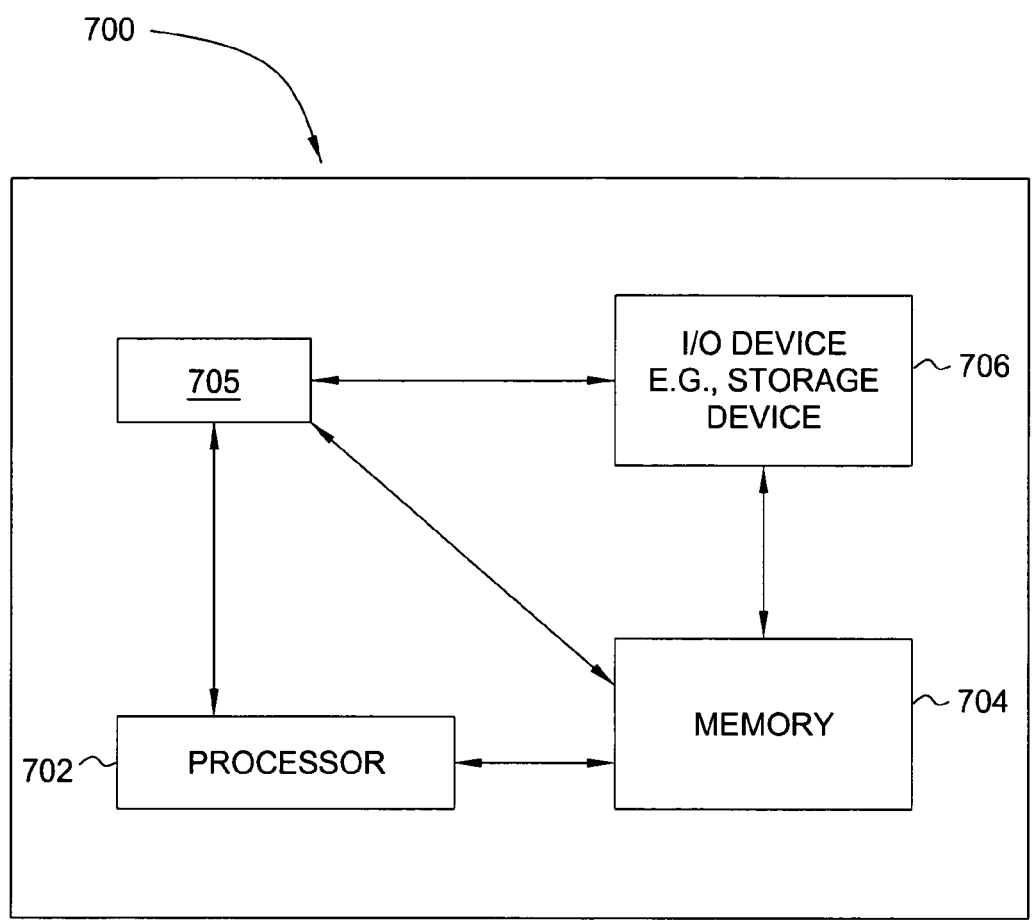
FIG. 7 depicts a high-level block diagram of a general-purpose computer suitable for use in performing the functions described herein.

FIG. 7 depicts a high level block diagram of a general purpose computer suitable for use in performing the functions described herein. As depicted in FIG. 7, system 700 includes a processor element 702 (e.g., a CPU), a memory 704, e.g., random access memory (RAM) and/or read only memory (ROM), a network topology module 705, and various input/output devices 706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present network topology module or process 705 can be loaded into memory 704 and executed by processor 702 to implement the functions as discussed above. As such, the network topology process 705 (including associated data structures) of the present invention can be stored on a computer readable medium, e.g., RAM memory, magnetic or optical drive or diskette and the like.

Although primarily depicted and described herein with respect to a mobile communications network, the network topology optimization analysis methodologies, including the associated communication link performance prediction methodologies, of the present invention may be utilized for controlling network topology in various other communications networks.

Although various embodiments that incorporate the teachings of the present invention have been shown and described in detail herein, those skilled in the art can readily devise many other varied embodiments that still incorporate these teachings.

What is claimed is:

1. A non-transitory computer readable medium for storing computer instructions which, when processed by a computer, adapt the operation of the computer to perform a method for determining a network connectivity in a network having a plurality of nodes, the method comprising the steps of:
   generating a candidate link for each of a plurality of node pairs;
   predicting a performance of each candidate link by evaluating an expected impact of at least one performance-impacting condition on each candidate link;
   determining the expected impact of the at least one performance-impacting condition on the candidate link using:
   (a) node position information associated with the nodes in the node pair, and
   (b) respective condition position information associated with each of the at least one performance-impacting condition;
   determining network topology changes using the predicted performances of the candidate links; and
   performing network layer routing protocol computations for discovering new routes associated with said network topology changes over a network planning window using various node specific configurations actions performed according to a configuration schedule.

2. The method of claim 1, wherein generating the candidate link for each node pair comprises the steps of:
   selecting a link model comprising at least one link parameter; and
   generating the candidate link using the link model, wherein the candidate link comprises a logical model of a potential physical link between the nodes in the associated node pair, wherein the candidate link comprises the at least one link parameter.

3. The method of claim 2, wherein generating the candidate link for each node pair further comprises the steps of:
   predicting position information for a first node in the node pair;
   predicting position information for a second node in the node pair;
   generating the candidate link for the node pair using the respective position information for the first and second nodes.

4. The method of claim 2, wherein the at least one link parameter comprises at least one performance evaluation parameter for determining the predicted performance of the candidate link, wherein the at least one performance evaluation parameter comprises at least one of a back-to-back performance of a transmitter-receiver pair of the node pair and a loss incurred during directed transmission.

5. The method of claim 2, wherein the at least one link parameter comprises at least one of a link type, a link direction, a link range, and a link capacity.

6. The method of claim 1, wherein predicting the performance of each candidate link comprises the steps of:
   identifying the at least one condition from a plurality of conditions associated with the network, each of the at least one condition identified using node position information associated with the nodes of the node pair and condition position information associated with each of the at least one condition;
   determining the expected impact of the at least one condition on the candidate link using the node position information and the condition position information; and
   predicting the performance of the candidate link by adjusting an expected performance of the candidate link using the expected impact of the at least one condition on the candidate link.

7. The method of claim 1, wherein predicting the performance of each candidate link comprises the step of:
   determining at least one of an outage probability of the candidate link and a mean power margin of the candidate link.

8. The method of claim 1, wherein predicting the performance of each candidate link comprises the steps of:
   identifying the at least one condition from a plurality of conditions associated with the network, each of the at least one condition identified using node position information associated with the nodes of the node pair and condition position information associated with each of the at least one condition, wherein at least a portion of the node and condition position information varies over a time period;
   determining a time-varying expected impact of the at least one condition on the candidate link over the time period using the node and condition position information; and predicting a time-varying performance of the candidate link over the time period by adjusting a time-varying expected performance of the candidate link using the time-varying expected impact of the at least one condition on the candidate link.

9. The method of claim 1, wherein the at least one condition comprises at least one of a network condition, a node condition, a link condition, and an environmental condition, wherein the environmental condition comprises at least one of a terrain condition, an atmospheric condition, and a weather condition.

10. The method of claim 1, wherein determining the network connectivity comprises the step of:
    selecting at least a portion of the candidate links using the performances of the respective candidate links.

11. The method of claim 10, further comprising:
    determining at least one configuration action for establishing the network connectivity, wherein the at least one configuration action comprises at least one of a link establishment action, a link maintenance action, a link reconfiguration action, a link replacement action, and a link removal action; and
    generating at least one configuration command using the at least one configuration action, the at least one configuration command adapted for physically establishing the selected candidate links in the network.

12. The method of claim 1, wherein determining the network connectivity comprises:
    determining an expected time delay associated with establishing the network connectivity in the network; and
    determining the network connectivity using the expected time delay.

13. An apparatus for determining a network connectivity in a network having a plurality of nodes, comprising:
    means for representing an overall network connectivity using a configuration schedule, wherein the configuration schedule comprises at least one configuration action for each of a plurality of time periods in a network planning window;
    means for generating a candidate link for each of a plurality of node pairs;
    means for predicting a performance of each candidate link by evaluating an expected impact of at least one performance-impacting condition on each candidate link;
    means for determining the expected impact of the at least one performance-impacting condition on the candidate link using:
    (a) node position information associated with the nodes in the node pair, and
    (b) respective condition position information associated with each of the at least one performance-impacting condition; and
    means for determining a network topology changes using the predicted performances of the candidate links; and
    means for performing network layer routing protocol computations for discovering new routes associated with said network changes over a network planning window using various node specific configurations actions performed according to a configuration schedule.

14. A non-transitory computer readable medium for storing computer instructions which, when processed by a computer, adapt the operation of the computer to perform a method for determining an overall network connectivity in a network having a plurality of nodes, the method comprising the steps of:
    performing the following steps for each of a plurality of time periods in a network planning window:
        representing the overall network connectivity using a configuration schedule, wherein the configuration schedule comprises at least one configuration action for each of a plurality of time periods in the network planning window;
        generating a candidate link for each of a plurality of node pairs;
        predicting a performance of each candidate link by evaluating an expected impact of at least one performance-impacting condition on each candidate link;
        determining the expected impact of the at least one performance-impacting condition on the candidate link using:
        (a) node position information associated with the nodes in the node pair, and
        (b) respective condition position information associated with each of the at least one performance-impacting condition; and
        determining network topology changes using the predicted performances of the candidate links; and
        processing each of the determined network topology changes associated with each of the plurality of time periods for determining the overall network connectivity associated with the network planning window; and
        performing network layer routing protocol computations for discovering new routes associated with network topology changes over the network planning window using various node specific configurations actions performed according to a configuration schedule.

15. A non-transitory computer readable medium for storing computer instructions which, when processed by a computer, adapt the operation of the computer to perform a method for determining a network connectivity in a network having a plurality of nodes, the method comprising the steps of:
    representing an overall network connectivity using a configuration schedule, wherein the configuration schedule comprises at least one configuration action for each of a plurality of time periods in a network planning window;
    generating, for each of the plurality of time periods in a time window, a plurality of candidate links, the plurality of candidate links associated with a plurality of node pairs in a set of node pairs;
    predicting, for each time period, a performance of each candidate link generated in that time period, the predicted performances being determined by evaluating an expected impact of at least one performance-impacting condition on each candidate link;
    determining the expected impact of the at least one performance-impacting condition on the candidate link using:
    (a) node position information associated with the nodes in the node pair, and
    (b) respective condition position information associated with each of the at least one performance-impacting condition;
    (c) network connectivity for the time window by selecting, for each time period, at least a portion of the candidate links of the time period, the candidate links selected for each time period for satisfying at least one performance quality measure; and
    (d) network layer routing protocol computations for discovering new routes associated with network topology changes over a network planning window using various node specific configurations actions performed according to a configuration schedule.

16. The method of claim 15, wherein generating the candidate link for each node pair comprises the steps of:

selecting a link model comprising at least one link parameter; and generating the candidate link using the link model, wherein the candidate link comprises a logical model of a potential physical link between the nodes in the associated node pair, wherein the candidate link comprises the at least one link parameter.

17. The method of claim 16, wherein generating the candidate link for each node pair further comprises the steps of:
predicting position information for a first node in the node pair;
predicting position information for a second node in the node pair;
generating the candidate link for the node pair using the respective position information for the first and second nodes.

18. The method of claim 15, wherein predicting the performance of each candidate link comprises the steps of:
identifying the at least one condition from a plurality of conditions associated with the network, each of the at least one condition identified using node position information associated with the nodes of the node pair and condition position information associated with each of the at least one condition;
determining the expected impact of the at least one condition on the candidate link using the node position information and the condition position information; and
predicting the performance of the candidate link by adjusting an expected performance of the candidate link using the expected impact of the at least one condition on the candidate link.

19. A non-transitory computer readable medium for storing computer instructions which, when processed by a computer, adapt the operation of the computer to perform a method for establishing a network connectivity in a network having a plurality of nodes, comprising the steps of:
representing an overall network connectivity using a configuration schedule, wherein the configuration schedule comprises at least one configuration action for each of a plurality of time periods in a network planning window;
receiving, at a first node, a configuration message adapted for triggering at least one link configuration action associated with a link between the first node and a second node, the at least one link configuration action determined by a method comprising:
generating a candidate link for each of a plurality of node pairs;
predicting a performance of each candidate link by evaluating an expected impact of at least one performance-impacting condition on each candidate link;
determining the expected impact of the at least one performance-impacting condition on the candidate link using:
(a) node position information associated with the nodes in the node pair, and
(b) respective condition position information associated with each of the at least one performance-impacting condition;
determining the at least one link configuration action using the predicted performances of the candidate links; and
performing network layer routing protocol computations for discovering new routes associated with network topology changes over a network planning window the at least one link configuration action being node specific and performed according to a configuration schedule.

20. An apparatus for establishing a network connectivity in a network having a plurality of nodes, comprising:
means for representing an overall network connectivity using a configuration schedule, wherein the configuration schedule comprises at least one configuration action for each of a plurality of time periods in a network planning window;
a receiver for receiving, at a first node, a configuration message adapted for triggering at least one link configuration action associated with a link between the first node and a second node, the at least one link configuration action determined by:
means for generating a candidate link for each of a plurality of node pairs;
means for predicting a performance of each candidate link by evaluating an expected impact of at least one performance-impacting condition on each candidate link;
determining the expected impact of the at least one performance-impacting condition on the candidate link using:
(a) node position information associated with the nodes in the node pair, and
(b) respective condition position information associated with each of the at least one performance-impacting condition;
means for determining the at least one link configuration action using the predicted performances of the candidate links;
means for performing network layer routing protocol computations for discovering new routes associated with network topology changes over a network planning window, the at least one link configuration action being node specific and performed according to a configuration schedule; and
a processor coupled to the receiver for processing the configuration message to trigger the at least one configuration action associated with the link between the first node and the second node.

* * * * *